US012558899B2

(12) United States Patent
Kajihara et al.

(10) Patent No.: US 12,558,899 B2
(45) Date of Patent: Feb. 24, 2026

(54) PRINTING APPARATUS AND CLEANING APPARATUS FOR THE SAME

(71) Applicant: SCREEN Holdings Co., Ltd., Kyoto (JP)

(72) Inventors: Kaisei Kajihara, Kyoto (JP); Mitsuru Tanemoto, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 197 days.

(21) Appl. No.: 18/592,292

(22) Filed: Feb. 29, 2024

(65) Prior Publication Data

US 2024/0326445 A1 Oct. 3, 2024

(30) Foreign Application Priority Data

Mar. 27, 2023 (JP) ................................ 2023-049578

(51) Int. Cl.
*B41J 2/165* (2006.01)

(52) U.S. Cl.
CPC ....... *B41J 2/16547* (2013.01); *B41J 2/16538* (2013.01); *B41J 2/16541* (2013.01); *B41J 2/16552* (2013.01); *B41J 2002/16558* (2013.01)

(58) Field of Classification Search
CPC ......................... B41J 2/16547; B41J 2/16538; B41J 2/16541; B41J 2/16552; B41J 2002/16558; B41J 2/16508; B41J 2/16544; B41J 2/16585; B41J 25/304
See application file for complete search history.

(56) References Cited

U.S. PATENT DOCUMENTS

2024/0100832 A1* 3/2024 Kajihara .............. B41J 2/16547
2024/0100834 A1* 3/2024 Kajihara .............. B41J 2/16547

FOREIGN PATENT DOCUMENTS

CN 116265252 A * 6/2023 .......... B41J 2/16508
JP 2015-217593 A 12/2015
JP 2024019934 A * 2/2024

* cited by examiner

*Primary Examiner* — Sharon Polk
(74) *Attorney, Agent, or Firm* — Rimon P.C.

(57) ABSTRACT

The present invention is directed to a printing apparatus including: a printing head including at least one or more nozzle blocks each having a nozzle opening plane from which ink is discharged downward; and a maintenance part including a maintenance member for maintenance on the nozzle opening plane from below the printing head, especially, relates to a technique for cleaning the maintenance member. A cleaning execution unit is mounted on the printing head in such a manner as to face the maintenance member from above. During a cleaning process, the cleaning execution unit is moved up and down integrally with the printing head in the vertical direction relative to the maintenance member to come into contact with the top of the cleaning target site. By doing so, the top of the cleaning target site is cleaned.

11 Claims, 14 Drawing Sheets

PRINTING APPARATUS AND CLEANING APPARATUS FOR THE SAME

CROSS REFERENCE TO RELATED APPLICATION

The disclosure of Japanese Patent Application No. 2023-049578 filed on Mar. 27, 2023 including specification, drawings and claims is incorporated herein by reference in its entirety.

BACKGROUND OF THE INVENTION

1. Field of the Invention

This invention relates to a technique for cleaning a maintenance member for maintenance on a nozzle opening plane from which ink is discharged for printing.

2. Description of the Related Art

Purging or wiping may be performed as part of maintenance on a nozzle opening plane with a large number of nozzles from which ink is discharged. The purging is a process of discharging ink of a certain amount regularly from the nozzles while a cap for covering the nozzles faces the nozzle opening plane. After implementation of the purging, the ink having flowed out of the nozzles may remain on and adhere to the nozzle opening plane. In response to this, the wiping is performed to wipe off the ink from the nozzle opening plane with a wiper. If maintenance is performed on the nozzle opening plane in this way using a maintenance member such as the wiper or the cap, the ink may adhere to the wiper or the cap. In this regard, a cleaning member such as a roller may be provided further that comes into contact with such maintenance members to remove the ink therefrom (see JP 2015-217593A1, for example).

SUMMARY OF INVENTION

In conformity with timing of cleaning the maintenance member using the cleaning member, a height position of the cleaning member relative to the maintenance member is desired to be controlled in such a manner as to bring the cleaning member into contact with a cleaning target site at a top of the maintenance member and to prevent contact of the cleaning member with an area other than the cleaning target site. When the cleaning is not intended, the cleaning member is desirably located at a retracted position separated upward from the maintenance member and its surrounding. To fulfill these desires, it is required to control a height position of the cleaning member relative to the maintenance member in a vertical direction. However, JP 2015-217593A1 does not provide a particular statement about the movement of the cleaning member in the vertical direction relative to the maintenance member and does not give sufficient consideration to a technical aspect of cleaning the cleaning target site favorably without contaminating an area of the maintenance member other than the cleaning target site.

This invention has been made in view of the foregoing problem, and is intended to provide a printing apparatus and a cleaning method for the printing apparatus capable of cleaning a cleaning target site of a maintenance member favorably without contaminating an area of the maintenance member other than the cleaning target site.

One aspect of this invention is directed to a printing apparatus. The apparatus comprises: a printing head including at least one or more nozzle blocks each having a nozzle opening plane configured to discharge ink downward; a maintenance part including a maintenance member configured to maintenance on the nozzle opening plane from below the printing head; a cleaner part including a cleaning execution unit configured to clean a cleaning target site that is located at a top of the maintenance member and mounted on the printing head in such a manner as to face the maintenance member from above; an elevating mechanism configured to move the printing head and the cleaner part integrally in a vertical direction relative to the maintenance member; and a controller configured to control the elevating mechanism in such a manner as to bring the cleaning execution unit into contact with a top of the cleaning target site during a cleaning process of cleaning the cleaning target site using the cleaning execution unit.

Other aspect of the invention is a cleaning method for a printing apparatus, the printing apparatus including a printing head having a nozzle opening plane from which ink is discharged downward, and a maintenance part including a maintenance member for maintenance on the nozzle opening plane from below the printing head. The method comprises: (a) mounting a cleaning execution unit for cleaning a cleaning target site located at a top of the maintenance member in such a manner that the cleaning execution unit faces the maintenance member from above; and (b) cleaning the cleaning target site using the cleaning execution unit, wherein the operation (b) includes a step of integrally moving the cleaning execution unit and the printing head up and down in a vertical direction relative to the maintenance member, thereby bringing the cleaning execution unit into contact with a top of the cleaning target site.

According to the invention having the foregoing configuration, the cleaning execution unit of the cleaner part is mounted on the printing head in such a manner as to face the maintenance member from above. During the cleaning process of cleaning the cleaning target site using the cleaning execution unit, the cleaning execution unit is moved up and down integrally with the printing head in the vertical direction relative to the maintenance member to come into contact with the top of the cleaning target site. By doing so, the top of the cleaning target site is cleaned.

As described above, according to the invention, it is possible to clean the cleaning target site favorably without contaminating an area of the maintenance member other than the cleaning target site.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

DETAILED DESCRIPTION OF THE PREFERRED EMBODIMENTS

First Embodiment

Figure 1:
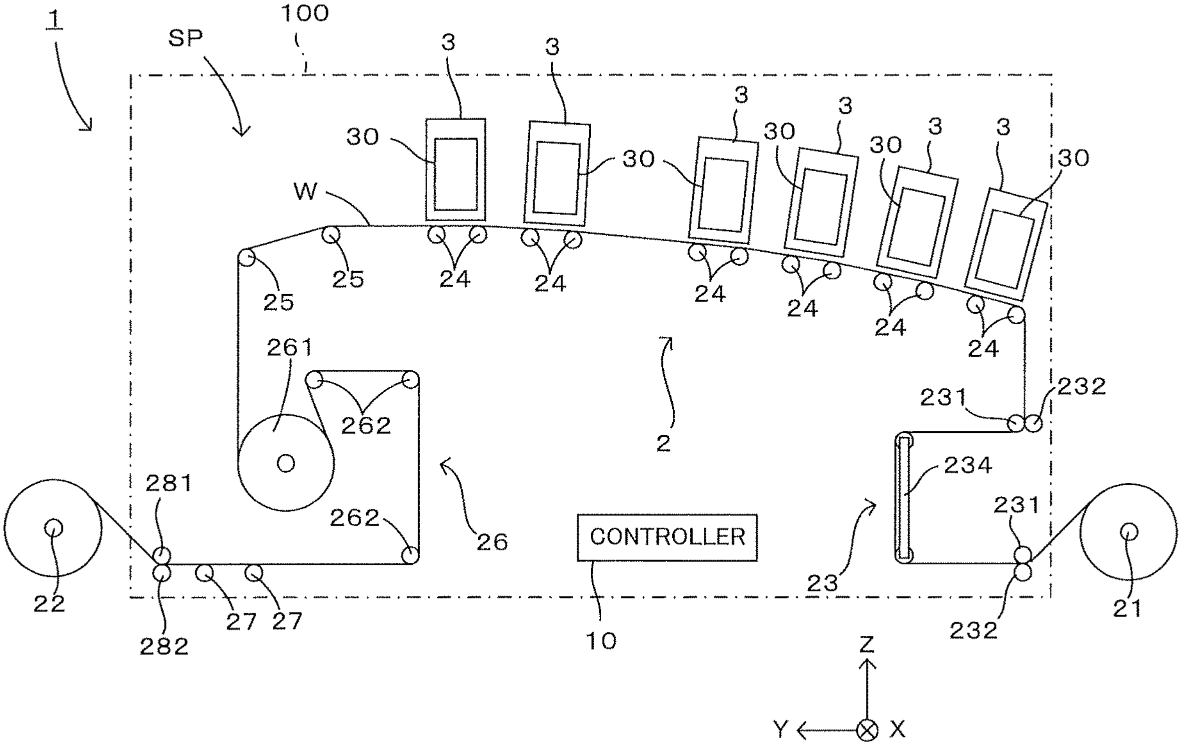
FIG. 1 is a front view schematically showing a first embodiment of a printing apparatus according to the invention.

FIG. 1 is a front view schematically showing a first embodiment of a printing apparatus according to the invention. In FIG. 1 and subsequent figures, an X direction, which is a horizontal direction, a Y direction, which is a horizontal direction orthogonal to the X direction, and a Z direction, which is a vertical direction, are shown as appropriate. The printing apparatus 1 prints images on a web W (base material) by discharging inks to the web W in an ink-jet method while conveying the web W which has a form of an elongated strip in a roll-to-roll manner in a housing 100. A material of the web W is paper or film and the web W is flexible. The printing apparatus 1 is provided with a controller 10 that integrally controls the entire apparatus, and a control required to print images on the web W is executed by the controller 10. This controller 10 is constituted with a processor such as a CPU (Central Processing Unit).

The printing apparatus 1 includes a conveyor 2 that conveys the web W. The conveyor 2 includes a feeding roller 21 and a take-up roller 22, and the web W is conveyed in a roll-to-roll manner by the take-up roller 22 taking up the web W fed by the feeding roller 21. This conveyor 2 includes a take-in unit 23 for taking in the web W fed from the feeding roller 21 between the feeding roller 21 and the take-up roller 22. The take-in unit 23 includes two drive rollers 231, two nip rollers 232 and an edge position adjuster 234 provided between the two drive rollers 231. Each drive roller 231 drives the web W wound thereon by being rotated by a drive force of a motor. The two nip rollers 232 are respectively provided to correspond to the two drive rollers 231, and the web W is sandwiched between each nip roller 232 and the corresponding drive roller 231. The edge position adjuster 234 adjusts the position of an end of the web W in the X direction, which is a width direction of the web W.

Further, the conveyor 2 includes a plurality of support rollers 24 for supporting the web W between the take-in unit 23 and the take-up roller 22. These support rollers 24 convey the web W in the Y direction while supporting the web W, to which the inks are discharged by the ink-jet method, from below. Particularly, the plurality of support rollers 24 are obliquely arrayed so that the support roller 24 more on a downstream side in a conveying direction (Y direction) of the web W is located at a higher position. Therefore, the web W conveyed by these support rollers 24 is obliquely conveyed to ascend in the Y direction.

Further, the conveyor 2 includes a plurality of support rollers 25 for supporting the web W between the support rollers 24 and the take-up roller 22 and a dryer 26 arranged between these support rollers 25 and the take-up roller 22. The dryer 26 includes a heat drum 261 and support rollers 262 for supporting the web W moving from the heat drum 261 toward the take-up roller 22. The heat drum 261 is rotationally driven according to the conveyance of the web W and dries the web W by heating the web W by a built-in heater. Further, the conveyor 2 includes a plurality of support rollers 27 for supporting the web W moving from the dryer 26 toward the take-up roller 22. Furthermore, the conveyor 2 includes a drive roller 281 and a nip roller 282 arranged between these support rollers 27 and the take-up roller 22. The drive roller 281 drives the web W wound thereon by being rotated by a drive force of a motor. The web W is sandwiched between the nip roller 282 and the drive roller 281.

As just described, in the conveyor 2, a conveyance path of the web W is formed by a combination of a plurality of rollers and the web W is conveyed along this conveyance path. Most of the conveyance path is formed in an internal space SP of the housing 100. But a part thereof, e.g., at least one of the feeding roller 21 and the take-up roller 22, may be provided outside the housing 100. By doing so, operability in mounting and removing the rolled web W on the feeding roller 21 and the take-up roller 22 can be enhanced.

The printing apparatus 1 includes a plurality of head units 3 facing the web W from above supported by the plurality of support rollers 24 in the housing 100. Although described in detail later, each head unit 3 includes a printing head 30. The printing head 30 discharges an ink downward from discharge ports (nozzles) provided in a lower part and attaching the ink to the web W being conveyed below. For example, color printing is realized by the printing heads 30 provided in the respective head units 3 discharging inks having mutually different colors. In this embodiment, six head units 3 are arranged along the conveyance path, but the number of the arranged head units 3 is arbitrary without being limited to this. Further, a combination of the types of the inks to be discharged from the respective printing heads 30 is also arbitrary. Furthermore, a plurality of printing heads may be provided for one head unit.

Further, each head unit 3 is provided with a maintenance part 50 to cover a lower part of the printing head 30 as described next. The function of the maintenance part 50 is to keep the nozzles of the printing head 30 clean and prevent clogging and, maintain a state where the printing head 30 can be quickly used for a printing operation, when necessary. Note that each head unit 3 is arranged at a different angle as shown in FIG. 1, but the configuration thereof itself can be basically the same. Accordingly, in the following description of the head units 3, those head units are not particularly distinguished.

The printing head 30, the maintenance part 50 and a mechanism for supporting those provided in the head unit 3 are described in detail later. Here, how these operate in a series of operations is first summarized.

Figure 2A:
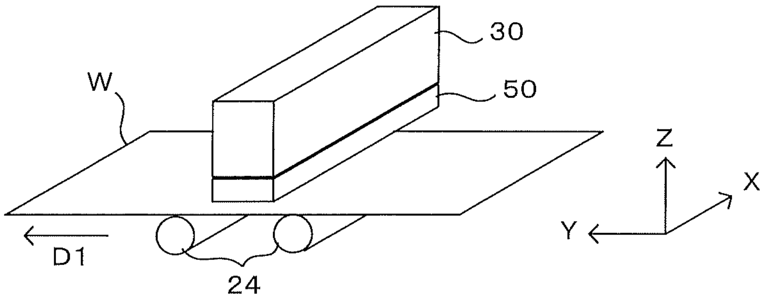
FIGS. 2A to 2C are diagrams showing a positional relationship of the printing head, the maintenance part and the web.
Figure 2B:
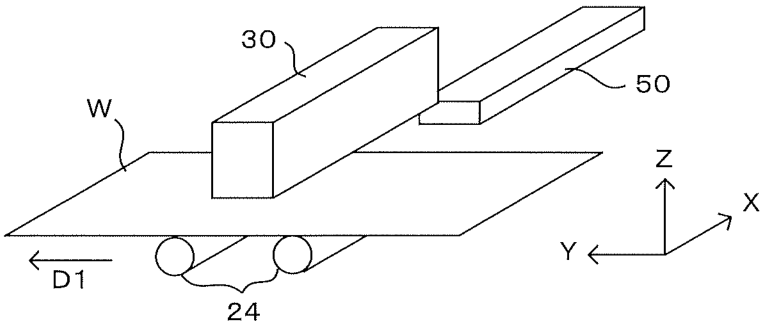
Figure 2C:
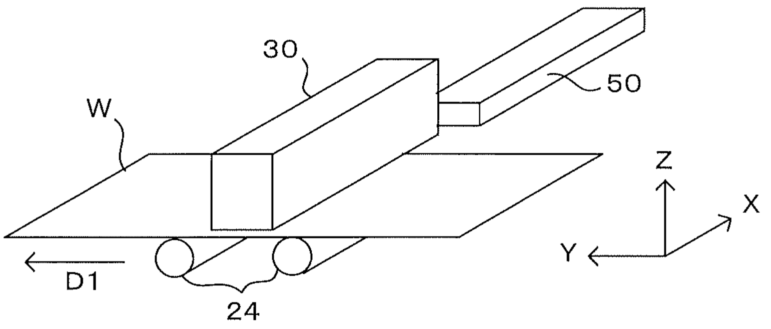

FIGS. 2A to 2C are diagrams showing a positional relationship of the printing head, the maintenance part and the web. Below the printing head 30, the web W is conveyed with the surface (surface to be printed) thereof facing substantially upward while being supported by the support rollers 24. A rotation axis direction of each support roller 24 is a horizontal direction, more specifically a direction parallel to the X direction. Accordingly, the web W is conveyed in a direction orthogonal to the X direction. As understood from FIG. 1, the conveying direction mainly has a Y-direction component immediately below each printing head 30 but is not necessarily a horizontal direction. In each of the following figures, the conveying direction of the web W immediately below each printing head 30 is represented by an arrow D1.

FIG. 2A shows a standby state where the printing operation is not performed. At this time, the printing head 30 is retracted upward from the web W being supported and conveyed by the support rollers 24, and the maintenance part 50 is arranged below the printing head 30, i.e., between the lower surface of the printing head 30 and the upper surface of the web W being conveyed.

From this state, the maintenance part 50 can be moved and retracted in the (+X) direction as shown in FIG. 2B. In this way, a space below the printing head 30 is opened and the lower surface faces the web W. Further, as described later, when the maintenance part 50 is moved in the (+X) direction along the lower surface of the printing head 30, a maintenance operation is performed for the nozzles provided in the lower part of the printing head 30. In addition, cleaning operations for the maintenance part 50 are performed in parallel with some of the maintenance operations.

The printing head 30 is movable up and down and, in a lowermost state, the lower surface of the printing head 30 is closely facing the upper surface of the web W as shown in FIG. 2C. In this state, the ink is discharged from the nozzles and printing is performed on the web W. In the later description, the position of the printing head 30 at this time may be referred to as a "printing position". If the printing is finished, the printing head 30 is moved up again and the maintenance part 50 is moved to a position below the printing head 30, thereby returning to the standby state shown in FIG. 2A.

Although the figure is omitted, the printing head 30 is movable in a direction of an arrow D2, i.e. in the (−X) direction, from the standby state shown in FIG. 2A. More specifically, the printing head 30 is movable from a position above the web W on the conveyance path as shown in FIG. 2A to a position separated from the web W toward a (−X) direction side, i.e., a position where the web W is not present below the printing head 30, as shown in FIG. 2D.

Figure 3:
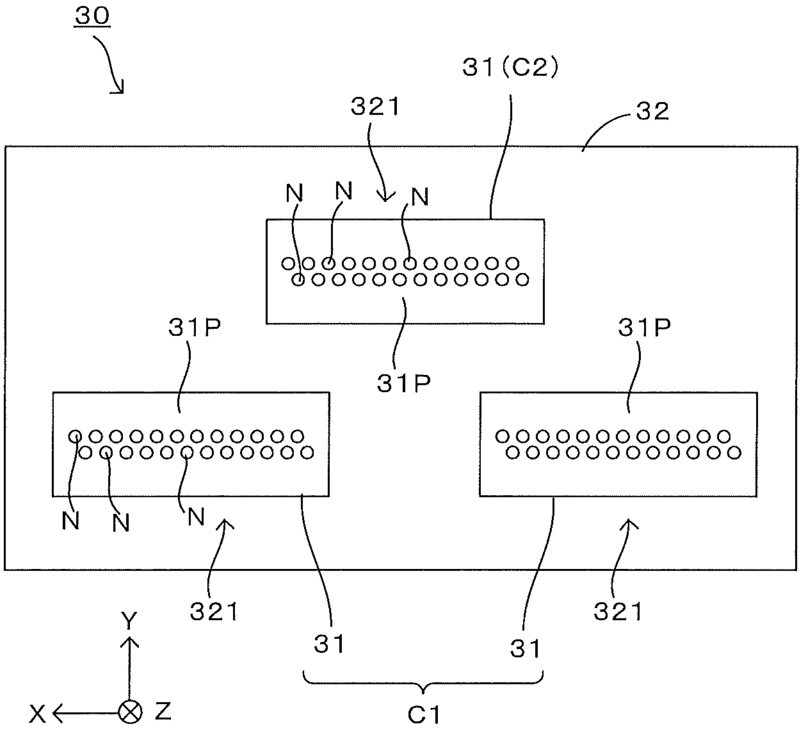
FIG. 3 is a bottom view schematically showing the configuration of the printing head.

FIG. 3 is a bottom view schematically showing the configuration of the printing head. The printing head 30 includes a plurality of (three) nozzle blocks 31. The plurality of nozzle blocks 31 are arrayed in two rows in a so-called staggered manner in the X direction. In other words, a nozzle block row C1 composed of two nozzle blocks 31 arrayed in parallel to the X direction and a nozzle block row C2 composed of one nozzle blocks 31 arrayed in parallel to the X direction are provided in the Y direction. In each nozzle block 31, a plurality of nozzles N are arranged in a staggered manner in the X direction to face the web W from above, and each nozzle N discharges the ink to the web W by the ink-jet method. The printing head 3 includes a holding member 32 for holding the respective nozzle blocks 31. The holding member 32 includes a plurality of insertion holes 321 provided to correspond to the plurality of nozzle blocks 31, and the plurality of nozzle blocks 31 are fixed to the holding member 32 while being inserted in the corresponding insertion holes 321. Such a holding member 32 can be constituted by a non-elastic member made of metal or resin. For ease of understanding, the 31 nozzle blocks comprising nozzle block row C1 will be referred to as "nozzle block 31*a*" and the 31 nozzle blocks comprising nozzle block row C2 as "nozzle block 31*b*.

As shown in FIG. 1, the posture of each of the plurality of head units 3 is set according to the inclination of the web W supported by the plurality of support rollers 24. That is, the respective head units 3 are so arranged that the head unit 3 more on an upstream side in the conveying direction of the web W, out of the plurality of head units 3, is more largely inclined with respect to the Z direction. However, the head unit 3 most downstream in the conveying direction (Y direction) of the web W is horizontally arranged and not inclined with respect to the Z direction. The head units 3 other than this most downstream head unit 3 are inclined to be higher in the conveying direction of the web W.

Figure 4:
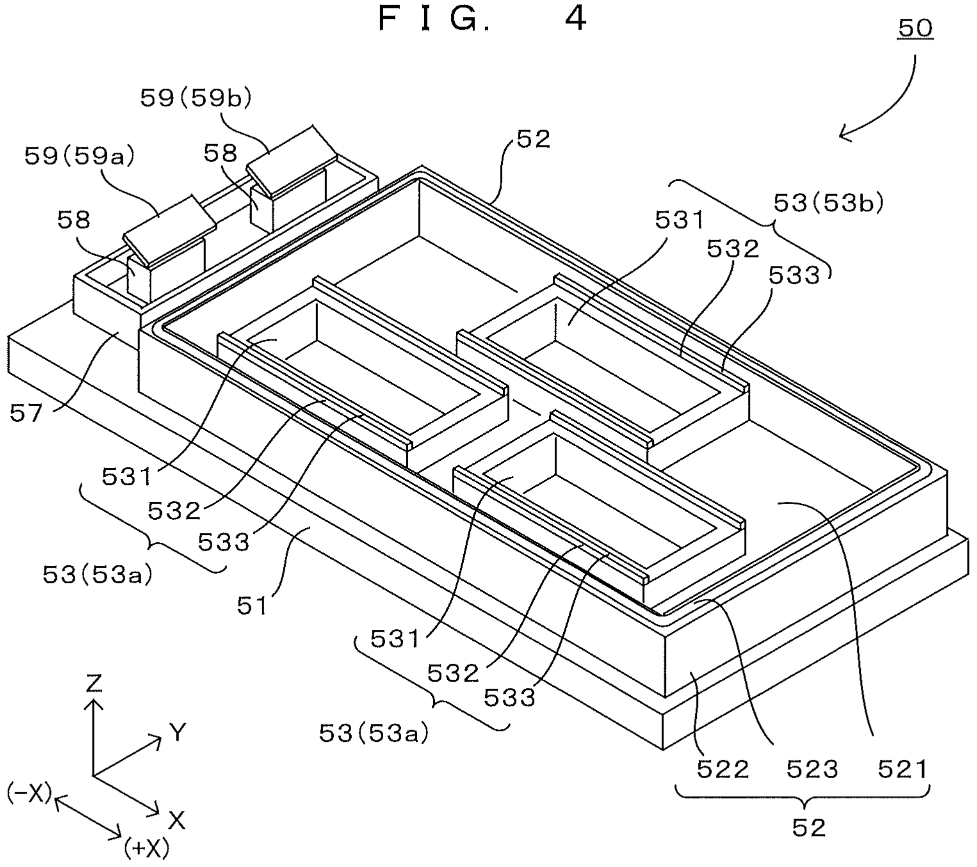
FIG. 4 is a perspective view schematically showing the configuration of the maintenance part.

FIG. 4 is a perspective view schematically showing the configuration of the maintenance part. As described above, the maintenance part 50 is provided for each of the plurality of printing heads 30. Each maintenance part 50 faces the corresponding printing head 30 from below. A plurality of the maintenance parts 50 provided to correspond to the plurality of printing heads 30 have a common configuration. Thus, one maintenance part 50 is described.

The maintenance part 50 includes a base member 51 having a rectangular parallelepiped shape long in the X direction. Box-shaped vats 52, 57 having an open upper part are mounted on this base member 51 to receive the ink discharged from the nozzle blocks 31 and various processing liquids. Caps 53 are provided to correspond to the number and positions of nozzle blocks 31 in the printing head 30 inside the larger vat 52. The vat 52 includes a bottom plate 521 having a rectangular shape in a plan view and a side wall 522 rising upward from a peripheral edge part of the bottom plate 521. The side wall 522 is a frame body having a rectangular shape in a plan view. An elastic member 523 is mounted on the entire periphery of the upper end of the side wall 522.

The cap 53 has a cap body 531 formed into a box shape corresponding to the outer shape of the nozzle block 31 and having an opening in an upper part. The cap body 531 has an upper end where rising members 532 rising upward are provided in such a manner as to interpose the opening from the (+Y) direction and the (−Y) direction. Each of the rising members 532 has a top where a sealing member 533 is mounted. For example, a rubber member having a stripe shape may be used as the sealing member 533.

While the maintenance part 50 is positioned immediately below the printing head 30 (see FIG. 2A), each of the three caps 53 is provided correspondingly to each nozzle block 31 and located at a position corresponding to the nozzle block 31. While not illustrated explicitly in FIG. 4, each cap 53 is supported in a state biased upward by an elastic member 56 such as a compression spring, for example, arranged on the bottom plate 521 of the vat 52. Thus, by locating the printing head 30 at a capping position (sign Pc in FIG. 6) in a vertical direction Z as described above, each nozzle block 31 is capped by the corresponding cap 53. At this time, by the biasing force of the elastic member 523, the sealing member 533 is brought into contact with a lower surface part of the printing head 30. By doing so, space around the nozzle block 31 is closed. As a result, drying of the ink around each nozzle N (FIG. 3) is suppressed.

By locating the printing head 30 at a purging position (sign Pp in FIG. 6) slightly above the capping position, the elastic member 523 is separated downward from the lower surface part of the printing head 30. Thus, only the sealing member 533 is in contact with the lower surface part of the printing head 30. In this state, purging can be performed by discharging the ink from each nozzle N, as necessary.

The ink discharged into the caps 53 is discharged via an unillustrated discharge system. For such a system and the purging performed thereby, those described in JP 2022-052195A1 previously disclosed by the applicant of this application can be suitably applied. Accordingly, this system and the purging are not described.

To facilitate understanding of the invention, in this specification, the cap 53 for the nozzle block 31*a* is called a "cap 53*a*" and the cap 53 for the nozzle block 31*b* is called a "cap 53*b*," as appropriate.

Referring back to FIG. 4, wiper blades 59 supported movably up and down by elevating mechanisms 58 using appropriate actuators are provided inside the smaller vat 57. Two pairs of the elevating mechanism 58 and the wiper blade 59 are provided to respectively correspond to two nozzle block rows C1, C2.

By locating the printing head 30 at a wiping position (sign Pw in FIG. 6) slightly above the purging position, the cap 53 is separated from the printing head 30 and a top 591 of the wiper blade 59 (see FIG. 10) is located at a position slightly higher than a lower surface, namely, a nozzle opening plane 31P (FIG. 3) of the nozzle block 31. By moving the maintenance part 50 in the (+X) direction in this state, the top 591 of the wiper blade 59 is rubbed against the lower surface (nozzle opening plane) of the nozzle block 31. In this way, the ink adhering around the nozzles N is wiped off to clean the nozzles N. The maintenance part 50 is movable further toward the (+X) direction side than an end surface of the printing head 30, whereby the nozzles N can be cleaned for all the nozzle blocks 31.

To facilitate understanding of the invention, the wiper blade 59 for the nozzle block 31*a* is called a "wiper blade 59*a*" and the wiper blade 59 for the nozzle block 31*b* is called a "wiper blade 59*b*," as appropriate.

Figure 5A:
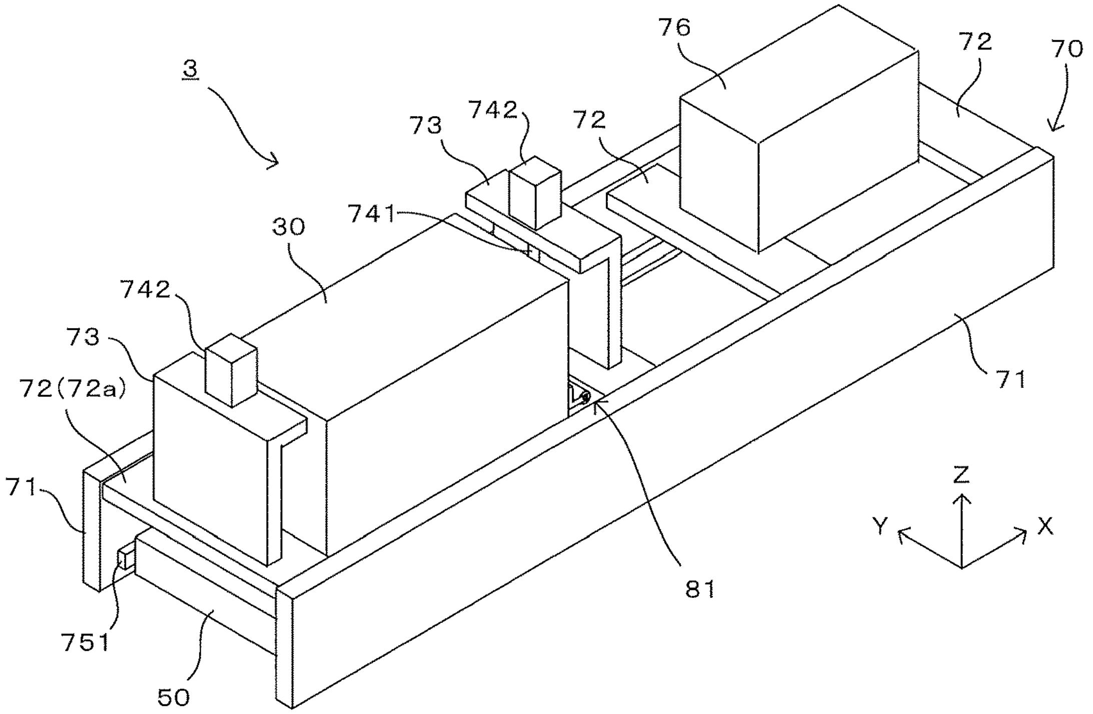
FIG. 5A is a perspective view showing the appearance of the head unit.
Figure 5B:
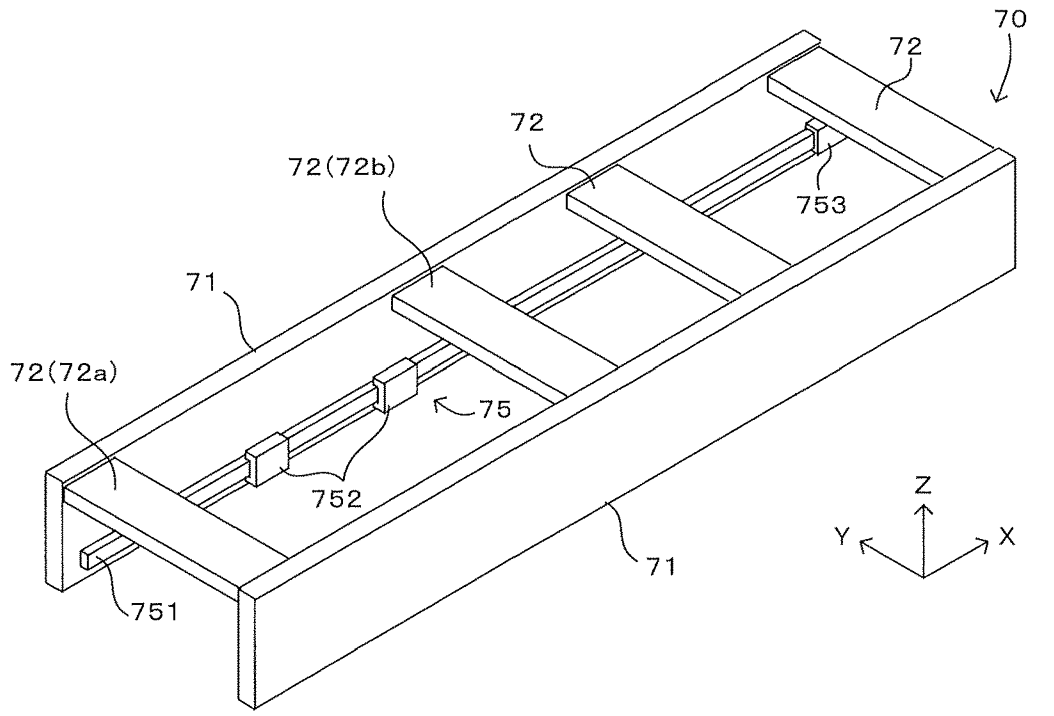
FIG. 5B is an appearance perspective view showing a frame of the head unit.
Figure 6:
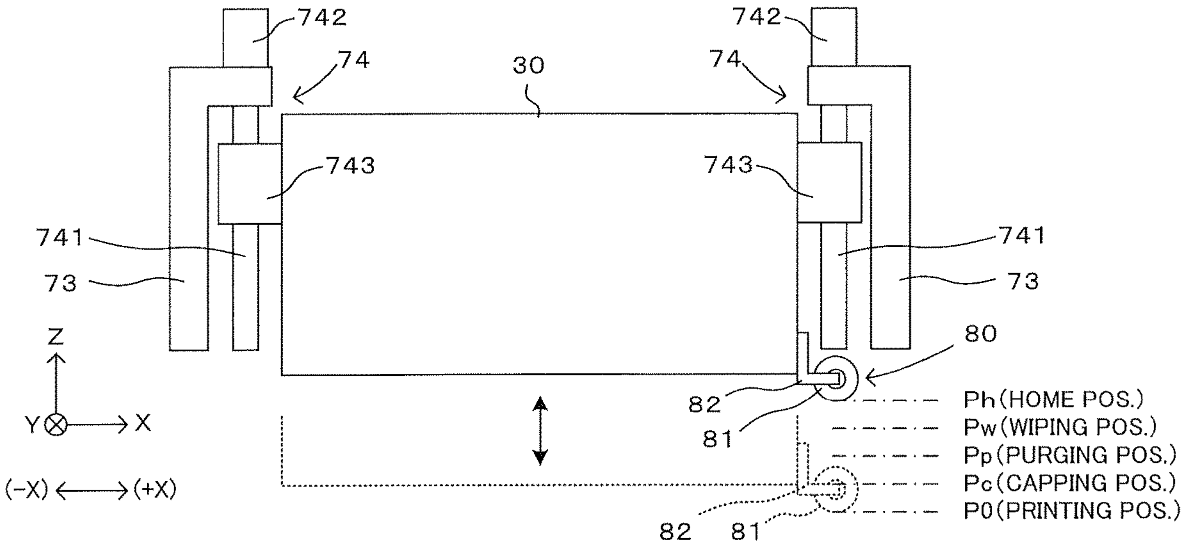
FIG. 6 is a side view of the head unit.
Figure 7A:
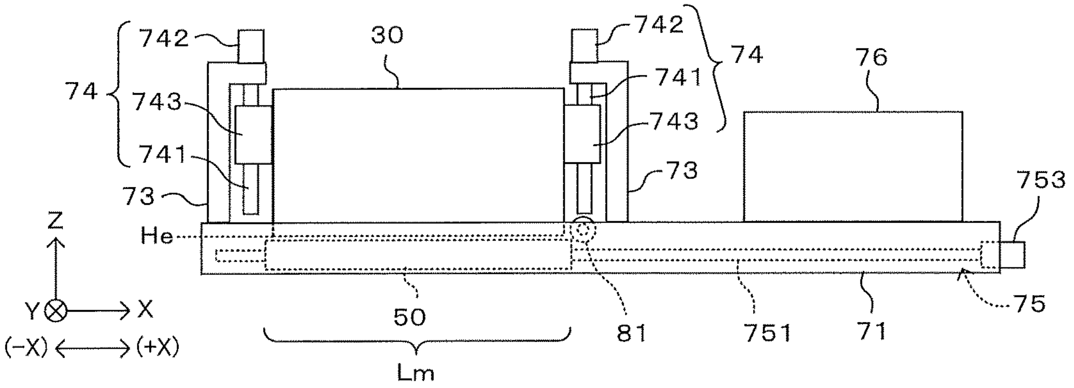
FIGS. 7A to 7C are side views showing the structure and operation of the head unit.
Figure 7B:
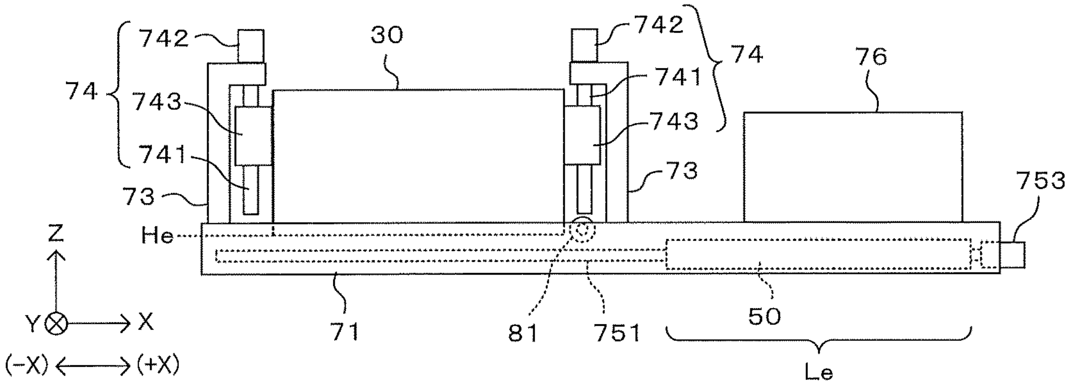
Figure 7C:
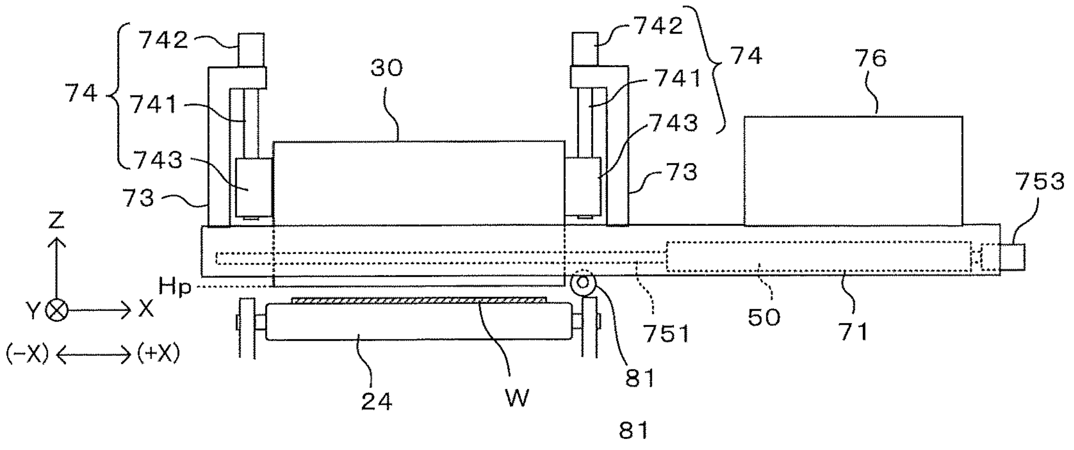

Next, the structure of the head unit 3 is described in more detail with reference to FIGS. 5A, 5B, 6, 7A, 7B and 7C. FIG. 5A is a perspective view showing the appearance of the head unit 3, and FIG. 5B is an appearance perspective view showing a frame 70 of the head unit 3. The head unit 3 is structured by mounting respective components on the frame 70 shown in FIG. 5B. To clearly show a frame structure shielded by these components, a structure when several components are mounted on the frame 70 before main parts are assembled is shown in FIG. 5B. Further, FIG. 6 is a side view of the head unit. FIGS. 7A to 7C are side views showing the structure and operation of the head unit.

As shown in FIG. 5B, the frame 70 is structured such that the pair of frame members 71 extending in parallel with the X direction as a longitudinal direction are coupled by several horizontal members 72 extending in the Y direction. The shapes of the frame members 71, the shapes, arrangement and number of the horizontal members 72 and the like are arbitrary without being limited to the shown ones. However, since the maintenance part 50 reciprocates between the frame members 71 arranged to face each other as described later, the frame 70 is desirably structured not to hinder this movement.

On the (−X) direction sides of the frame members 71, two horizontal members 72 (72*a*, 72*b*) are arranged at a predetermined interval in the X direction. This interval is larger than a length of the printing head 30 in the X direction. Head supporting side plates 73, 73 for supporting the printing head 30 movably up and down are mounted on the upper surfaces of these horizontal members 72*a*, 72*b*.

Specifically, as shown in FIG. 6, elevating mechanisms 74, 74 are respectively provided on the head supporting side plates 73, 73. The elevating mechanism 74 is, for example, a ball screw mechanism and includes a ball screw 741 extending in the vertical direction, a motor 742 for rotationally driving the ball screw 741 and an elevating block 743 having a nut engaged with the ball screw 741. The elevating blocks 743 are mounted on both end parts in the X direction of the printing head 30. Therefore, the motors 742, 742 synchronously rotate in response to a control command from the controller 10, whereby the elevating blocks 743, 743 move up and down to move the printing head 30 up and down with respect to the frame members 71. Therefore, the motors 742, 742 rotate synchronously in response to a control command from the controller 10, whereby the elevating blocks 743, 743 move up and down to move the printing head 30 and a cleaner part 80 mounted on the printing head 30 on the (+X) direction side up and down relative to the frame members 71. More specifically, as shown in FIG. 6, moving the printing head 30 and the cleaner part 80 up and down integrally allows the printing head 30 and the cleaner part 80 to be located at five types of positions in total including a printing position P0 for printing using by the printing head and a home position Ph where the printing head 30 and the cleaner part 80 are retracted upward in addition to the capping position Pc, the purging position Pp, and the wiping position Pw described above. As shown in FIG. 6, in this specification, these five types of positions are defined with respect to a height position in the vertical direction Z where a lowermost end of a cleaning roller 81 forming the cleaner part 80 is located. The printing position P0, the capping position Pc, the purging position Pp, the wiping position Pw, and the home position Ph are defined in this order as viewed from bottom to top.

As shown in FIG. 5B, guide rails 751 extending in the X direction are mounted on inner surfaces of the pair of frame members 71 facing each other. Sliders 752 are engaged with these guide rails 751 movably in the X direction, and motors 753 serving as drive sources for driving the sliders 752 in the X direction along the guide rails 751 are coupled to the guide rails 751. The maintenance part 50 is mounted on these sliders 752.

Accordingly, the motors 753 operate in response to a control command from the controller 10, whereby the maintenance part 50 moves in the X direction along the guide rails 751 between the pair of frame members 71 as shown in FIGS. 7A and 7B. That is, the guide rails 751, the sliders 752 and the motors 753 function as a moving mechanism 75 for moving the maintenance part 50 in the X direction. An appropriate one, for example, such as a linear motor, a ball screw mechanism, an air cylinder or a belt drive mechanism can be selected and used as such a moving mechanism 75.

The head unit 3 having such a structure can assume a state shown in FIG. 7A where the printing head 30 is retracted upward and the maintenance part 50 is located at a maintenance position Lm under the printing head 30, a state shown in FIG. 7B reached by moving the maintenance part 50 in the (+X) direction from the former state and locating the maintenance part 50 at a retracted position Le, and a state shown in FIG. 7C reached by retracting the maintenance part 50 in the (+X) direction and lowering the printing head to a position below the frame members 71. As is clear from comparison with FIGS. 2A to 2C, the state shown in FIG. 7A, the state shown in FIG. 7B and the state shown in FIG. 7C respectively correspond to FIGS. 2A, 2B and 2C.

Referring back to FIG. 5A, the head unit 3 is further described. An electrical box 76 is mounted on the (+X) direction sides of the frame members 71. The electrical box 76 accommodates various devices for properly operating the head unit 3 such as a control circuit for controlling the printing head 30 and the moving mechanism 75, a pump for feeding the ink to the printing head 30 and a power supply circuit for supplying power to these. By mounting the electrical box 76 provided with these on the frame members 71 integrally with the printing head 30, a stable operation can be realized by suppressing lengths of pipes and cables to the printing head 30.

A cleaner part 80 is provided on the (+X) direction side of the printing head 30 in the head unit 3. As described later, the cleaner part 80 is provided for the purpose of wiping the caps 53 and the wiper blades 59 provided in the maintenance part 50 to remove the ink remaining on and adhering to these.

Figure 8A:
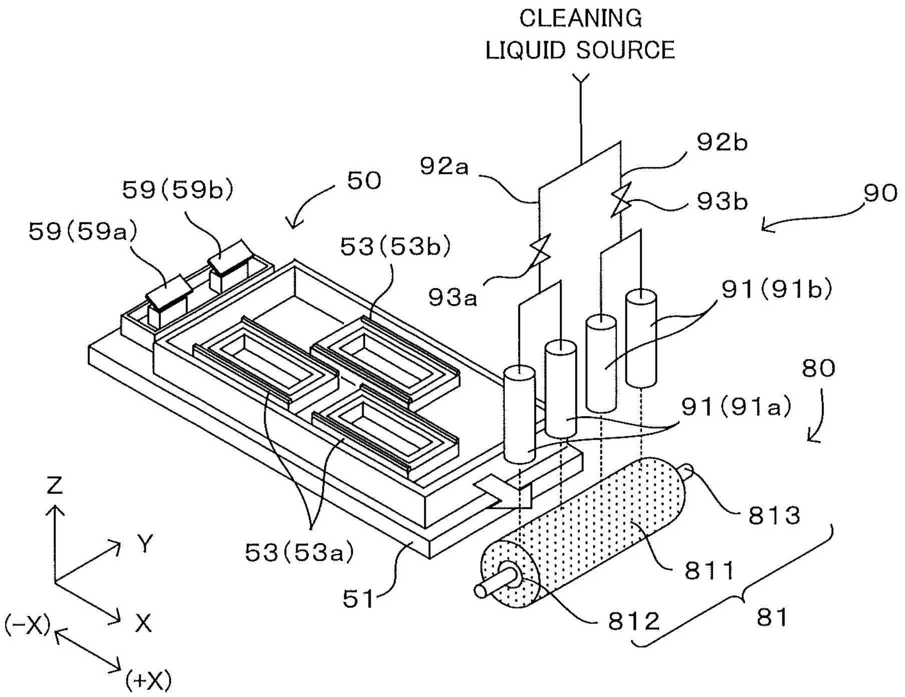
FIG. 8A is a perspective view schematically showing the configurations of the maintenance part and the cleaner part.
Figure 8B:
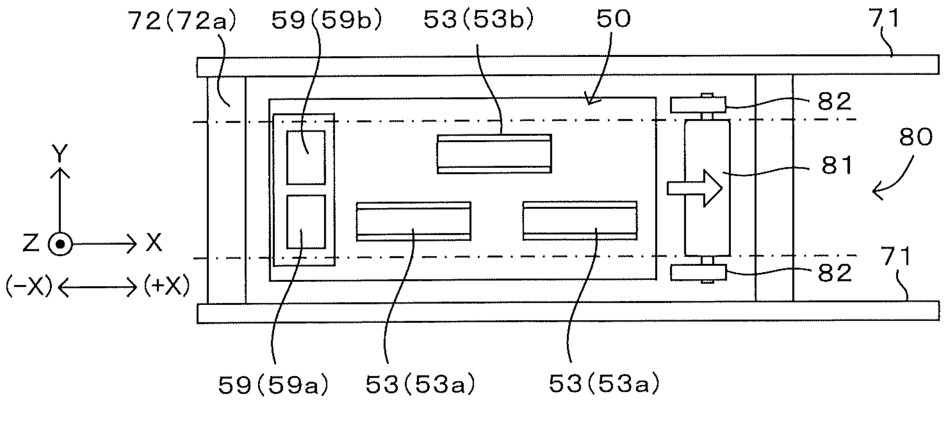
FIG. 8B is a plan view schematically showing the configurations of the maintenance part and the cleaner part.

FIG. 8A is a perspective view schematically showing the configurations of the maintenance part and the cleaner part. FIG. 8B is a plan view schematically showing the configurations of the maintenance part and the cleaner part. While the printing head 30 is not illustrated explicitly in these drawings, the cleaner part 80 is mounted on the printing head 30 and is movable in the vertical direction Z integrally with the printing head 30 over a movement path of the maintenance part 50. Meanwhile, like the printing head 30, the cleaner part 80 is fixedly arranged in the X direction and the Y direction.

The cleaner part 80 includes a cleaning roller 81 and bearing members 82. As shown by dashed-dotted lines in FIG. 8B, the cleaning roller 81 has a length in the Y direction that is set relatively long in such a manner as to cover an entire distribution range in the Y direction including the sealing members 533 of the caps 53 and the tops 591 of the wiper blades 59 each corresponding to an example of a "cleaning target site" of the invention. Meanwhile, in terms of the height direction Z, the printing head 30, the maintenance part 50, and the cleaner part 80 are designed in such a manner as to fulfill a positional relationship as follows. When the maintenance part 50 moves in the (+X) direction while the printing head 30 is kept at the capping position Pc, the cleaning roller 81 overlaps a path of the sealing member 533 of the cap 53. When the maintenance part 50 moves in the (+X) direction while the printing head 30 is kept at the wiping position Pw, the cleaning roller 81 overlaps a path of the top 591 of the wiper blade 59. In these ways, in the present embodiment, the cleaning roller 81 is mounted on the printing head in such a manner as to face a maintenance member including the cap 53 and the wiper blade 59 from above, and is capable of contacting the top of the cleaning target site of the maintenance member in a cleaning process. The "top of the cleaning target site" includes an entire upper surface of the sealing member 533 of the cap 53 and the top 591 of the wiper blade 59.

The cleaning roller 81 has a surface layer 811 formed at an outer peripheral surface thereof. The surface layer 811 is a sponge as a porous member, and has liquid retaining property to retain a cleaning liquid, and elasticity. Specifically, the cleaning roller 81 has a core 812 made of metal having a cylindrical shape parallel to the Y direction, and the surface layer 811 having a cylindrical shape is arranged around the core 812. A rotary shaft 813 is provided coaxially with a center of the core 812, and the rotary shaft 813 is supported at both ends thereof by bearing members 82, 82 in a pair in a manner allowing the rotary shaft 813 to rotate relative to the printing head 30. In this way, in the present embodiment, the elevating mechanisms 74, 74 fulfill the function of moving the cleaning roller 81 up and down and positioning the cleaning roller 81 in the vertical direction Z in addition to the function of moving the printing head 30 up and down and positioning the printing head 30 in the vertical direction Z. This makes it possible to avoid various problems occurring by adding another elevating mechanism dedicated to moving the cleaner part 80 up and down, specifically, cost increase and size increase of the apparatus, complication of the apparatus configuration and the like.

A cleaning liquid supplier 90 is provided for supplying a cleaning liquid to the cleaner part 80 having the foregoing configuration. As shown in FIG. 8A, the cleaning liquid supplier 90 includes a plurality of (in the present embodiment, four) tubes 91, and a tube holding member (sign 94 in FIGS. 10A to 10F referred to later) holding the tubes 91 while the tubes 91 are arrayed parallel to the cleaning roller 81. Each of the tubes 91 has a tip pointed toward the surface layer 811 of the cleaning roller 81. Meanwhile, of all the tubes 91, two tubes 91*a* on the (−Y) direction side have respective rear ends connected through a pipe 92*a* to a cleaning liquid source, and two tubes 91*b* on the (+Y) direction side have respective rear ends connected through a pipe 92*b* to the cleaning liquid source. An on-off valve 93*a* and an on-off valve 93*b* are interposed in the pipes 92*a* and 92*b* respectively. Thus, opening only the on-off valve 93*a* in response to a control command from the controller 10 supplies the cleaning liquid from the cleaning liquid source only to the surface layer 811 on the (−Y) direction side through the tubes 91*a*. Conversely, opening only the on-off valve 93*b* in response to a control command from the controller supplies the cleaning liquid from the cleaning liquid source only to the surface layer 811 on the (+Y) direction side through the tubes 91*b*. Furthermore, opening both the on-off valves 93*a* and 93*b* in response to a control command from the controller 10 supplies the cleaning liquid to the surface layer 811 entirely. In this way, in the present embodiment, in terms of correspondence with the nozzle block rows C1 and C2, a cleaning unit (including the tubes 91*a*, the pipe 92*a*, and the on-off valve 93*a*) is provided for the nozzle block row C1 and a cleaning unit (including the tubes 91*b*, the pipe 92*b*, and the on-off valve 93*b*) is provided for the nozzle block row C2. Specifically, as a result of on-off control over the on-off valves 93*a* and 93*b* by the controller 10, it is possible to make a switch between liquid feed of the cleaning liquid to the tubes 91*a* and stop of the liquid feed and to make a switch between liquid feed of the cleaning liquid to the tubes 91*b* and stop of the liquid feed independently of each other. As a result, by giving consideration to a larger number of nozzle blocks in the nozzle block row C1, for example, the controller 10 can control the on-off valves 93*a* and 93*b* in such a manner as to supply the cleaning liquid trough the tubes 91*a* at a higher frequency than the frequency of supply through the tubes 91*b*.

Figure 9:
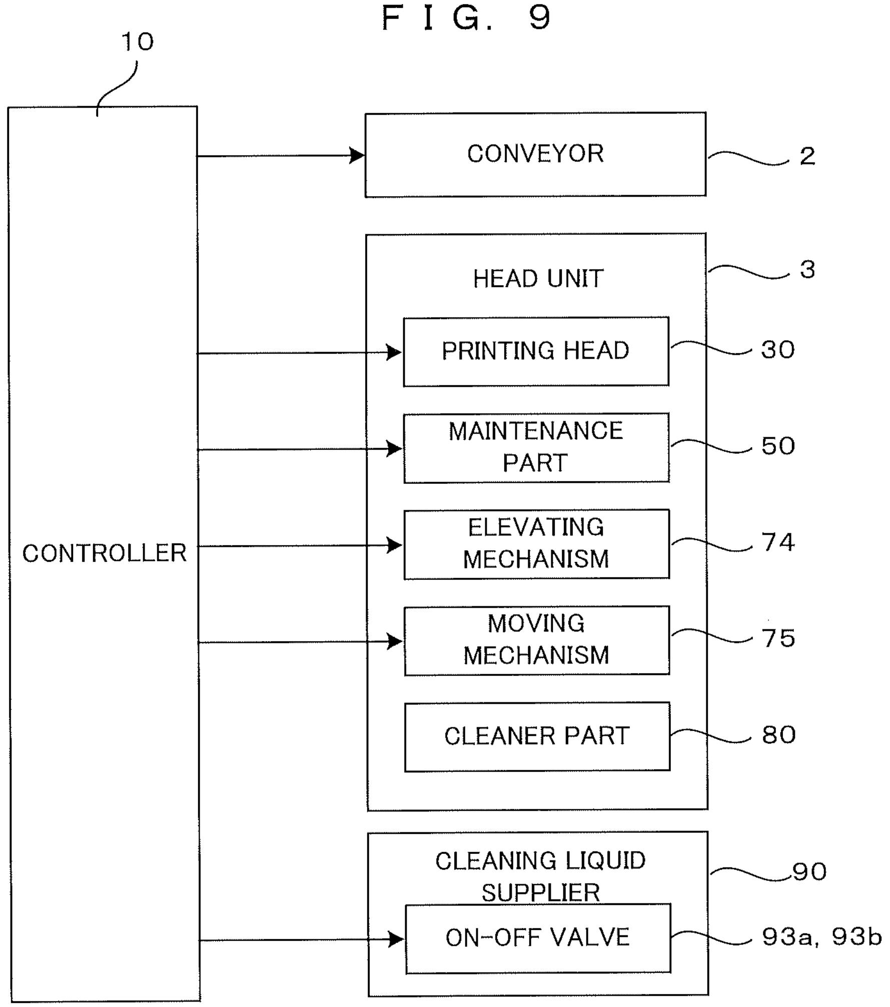
FIG. 9 is a block diagram showing an electrical configuration of this printing apparatus.

FIG. 9 is a block diagram showing an electrical configuration of this printing apparatus. The controller 10 gives a control command to each component of the apparatus described above to cause each component to perform a predetermined operation. For this purpose, the controller 10 is provided with a CPU, which is an execution subject of various control programs, a storage device for storing and saving the control programs and various pieces of data, a user interface device and the like. For example, a computer device, a workstation or the like having a general hardware configuration can be used as the controller 10.

The controller 10 controls each part of the apparatus by following the control programs to perform the standby operation shown in FIG. 2A, the maintenance operation shown in FIG. 2B, and the printing operation shown in FIG. 2C. An example of a "cleaning step" of the invention is performed in parallel with the maintenance operation of these operations. The following describes the maintenance operation together with the cleaning step in detail by referring to FIGS. 10A to 10F. In these drawings, illustrating a positional relationship between parts explicitly comes first and the dimension of each part or the number of such parts is exaggerated or simplified, as necessary. In FIGS. 10A to 10F, regarding symbols indicating the on-off valves 93*a* and 93*b*, a symbol with black triangles means that the on-off valve is opened and a symbol with white triangles means that the on-off valve is closed.

Figure 10A:
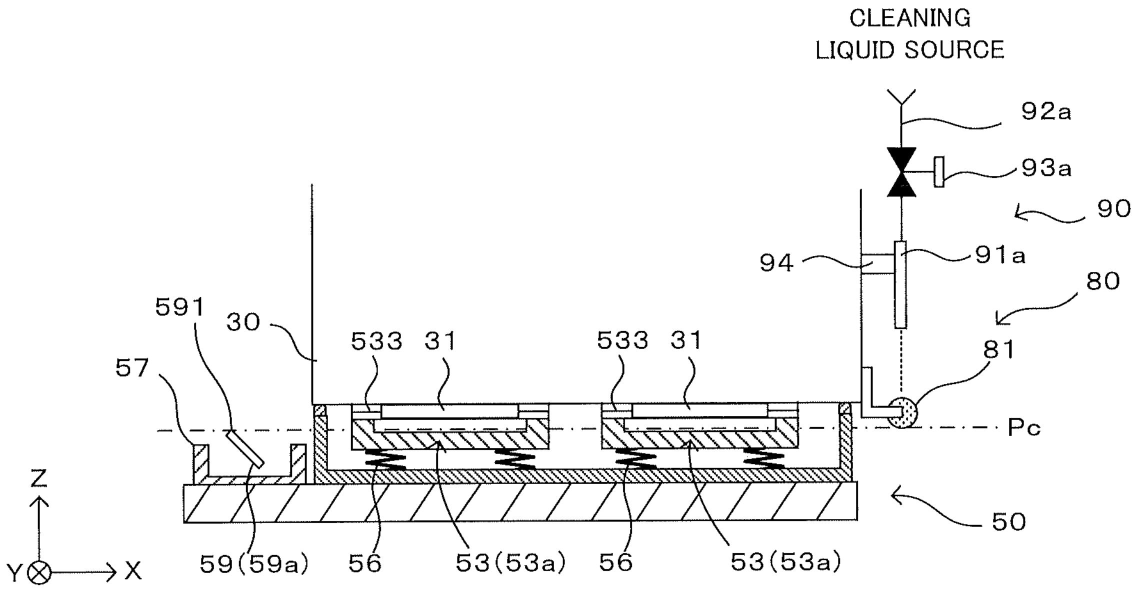
FIG. 10A schematically shows a positional relationship between the printing head, the maintenance part, the cleaning roller and the tube in the standby state.

FIG. 10A schematically shows a positional relationship between the printing head 30, the maintenance part 50, the cleaning roller 81, and the tube 91*a* in the standby state. As shown in FIG. 10A, in the standby state, the maintenance part 50 is positioned immediately below the printing head 30 in the horizontal direction X and the printing head 30 is located at the capping position Pc in the vertical direction Z. By doing so, each nozzle block 31 is surrounded by the cap 53. Space around the nozzle block 31 is closed by the sealing member 533 and the biasing force of the elastic member 56. As a result, drying of the ink around each nozzle N (FIG. 3) is suppressed.

In the standby state, the controller 10 opens the on-off valve 93*a*, 93*b* as necessary to drip the cleaning liquid onto the cleaning roller 81, thereby wetting the surface layer 811 of the cleaning roller 81. Opening both the on-off valves 93*a* and 93*b* allows the cleaning liquid to be supplied to the surface layer 811 over an entire area in the Y direction. The number of the cleaning target sites differs between the nozzle block rows C1 and C2. Specifically, the number of the cleaning target sites corresponding to the nozzle block row C1 is larger than that corresponding to the nozzle block row C2. For this reason, the cleaning liquid is likely to be consumed by a larger amount in a region of the surface layer 811 corresponding to the nozzle block row C1 than in a region of the surface layer 811 corresponding to the nozzle block row C2. Thus, the on-off valve 93*a* may be set to be opened for a longer duration or at a higher frequency than the on-off valve 93*b*. When supply of the cleaning liquid to the cleaning roller 81 is completed in this way, the controller 10 closes the on-off valve 93*a*, 93*b* to stop drip of the cleaning liquid. In the present embodiment, the tip of each tube 91 is always pointed toward the surface layer 811 of the cleaning roller 81. Thus, if appropriate, the cleaning liquid may certainly be supplied to the cleaning roller 81 during movement of the maintenance part 50 in the X direction, as will be described next.

By making a shift from the standby state where the cleaning liquid of an amount suitable for the cleaning process is retained on the cleaning roller 81 in this way to a maintenance state, pressurized purging and wiping are performed while the cleaning process using the cleaning roller 81 is performed favorably, as will be described in detail below.

Figure 10B:
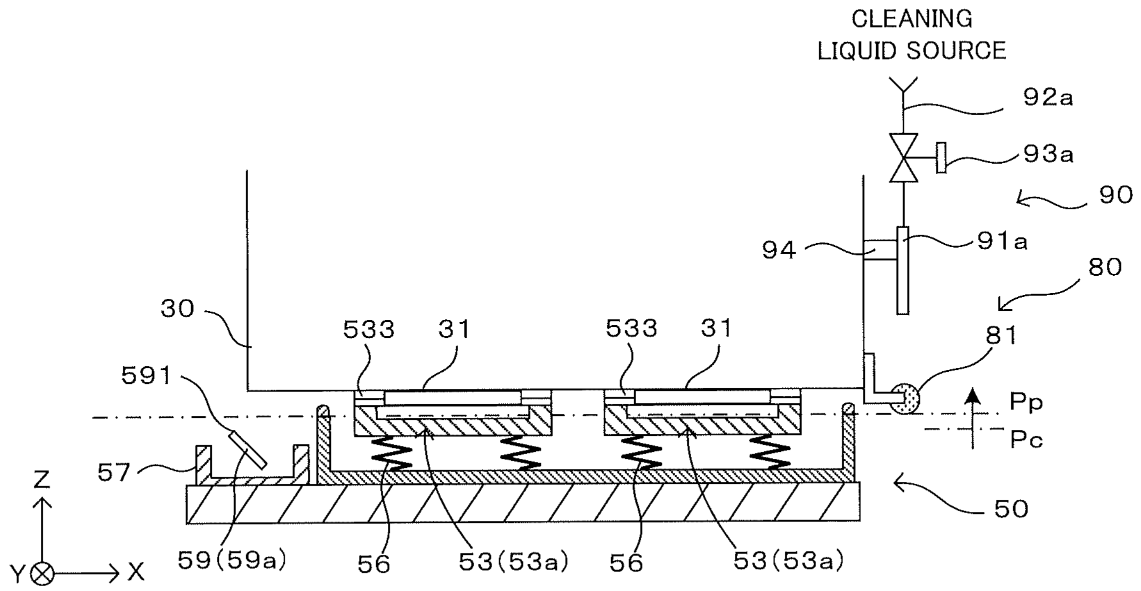
FIG. 10B schematically shows a positional relationship between the printing head, the maintenance part, the cleaning roller, and the tube during the pressurized purging.

FIG. 10B schematically shows a positional relationship between the printing head 30, the maintenance part 50, the cleaning roller 81, and the tube 91*a* during the pressurized purging. As indicated by an arrow in FIG. 10B, for implementation of the pressurized purging, the controller 10 lifts the printing head 30 from the capping position Pc to the purging position Pp. Then, the controller 10 discharges the ink from each nozzle N (purging).

Figure 10C:
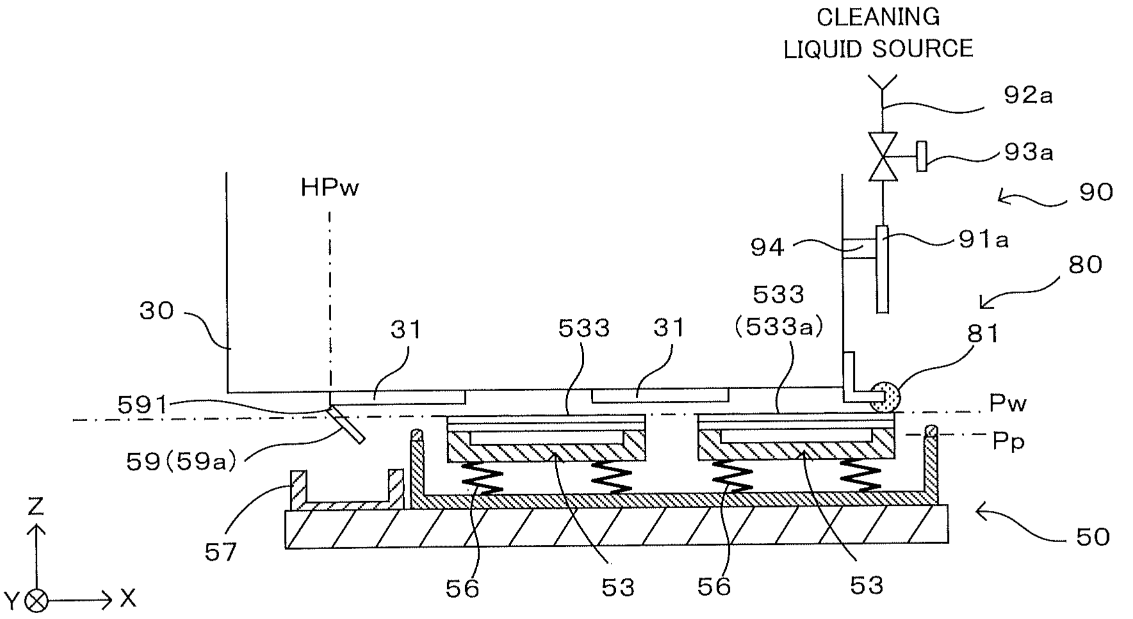
FIG. 10C schematically shows a positional relationship between the printing head, the maintenance part, the cleaning roller, and the tube at the start of the wiping.

To wipe off the ink having flowed out of the nozzle N as a result of this purging, the controller 10 controls each part of the apparatus as follows to make preparation for the wiping. Specifically, the printing head 30 is lifted from the purging position Pp to the home position Ph. This locates the cleaning roller 81 at a position higher than the cap 53 in the vertical direction Z to avoid interference with the maintenance part 50. In this state of avoiding interference, the controller 10 moves the maintenance part 50 in the (+X) direction. When the top 591 of the wiper blade 59 reaches a wipe start position HPw in the X direction as shown in FIG. 10C, the controller 10 stops the movement of the maintenance part 50. In this embodiment, the wipe start position HPw is defined for the nozzle block 31 in the nozzle block row C1 on the (−X) direction side. More specifically, as shown in FIG. 10C, the wipe start position HPw is defined for a side of this nozzle block 31 closest to the (−X) direction side. At the wipe start position Hpw, the controller 10 lowers the printing head 30 from the home position Ph to the wiping position Pw and lifts the wiper blade 59 corresponding to the nozzle block row C1. As a result of these motions, the top 591 of the wiper blade 59 is located at a position slightly higher than the lower surface of the nozzle block 31 and comes into contact with the lower surface of the nozzle block 31. By doing so, preparation for the wiping is completed.

In parallel with the preparation for the wiping, preparation is made for the cleaning process on the sealing member 533. Specifically, along with the foregoing lowering of the printing head 30 to the wiping position Pw, the cleaning roller 81 mounted on the printing head 30 is also lowered and a lowermost end part of the cleaning roller 81 comes into contact with the sealing member 533 (sign 533*a* in FIG. 10C) closest to the (+X) direction side in the X direction in such a manner as to cover this sealing member 533 from above. The sealing member 533*a* is a cleaning target site capping the nozzle block 31 in the nozzle block row C1 on the (+X) direction side and located at a top of the cap 53 used for the pressurized purging on this nozzle block 31. A sealing region of the sealing member 533*a* on the (+X) direction side contacts the cleaning roller 81. In this way, preparation for the cleaning process on the sealing member 533*a* is completed.

Figure 10D:
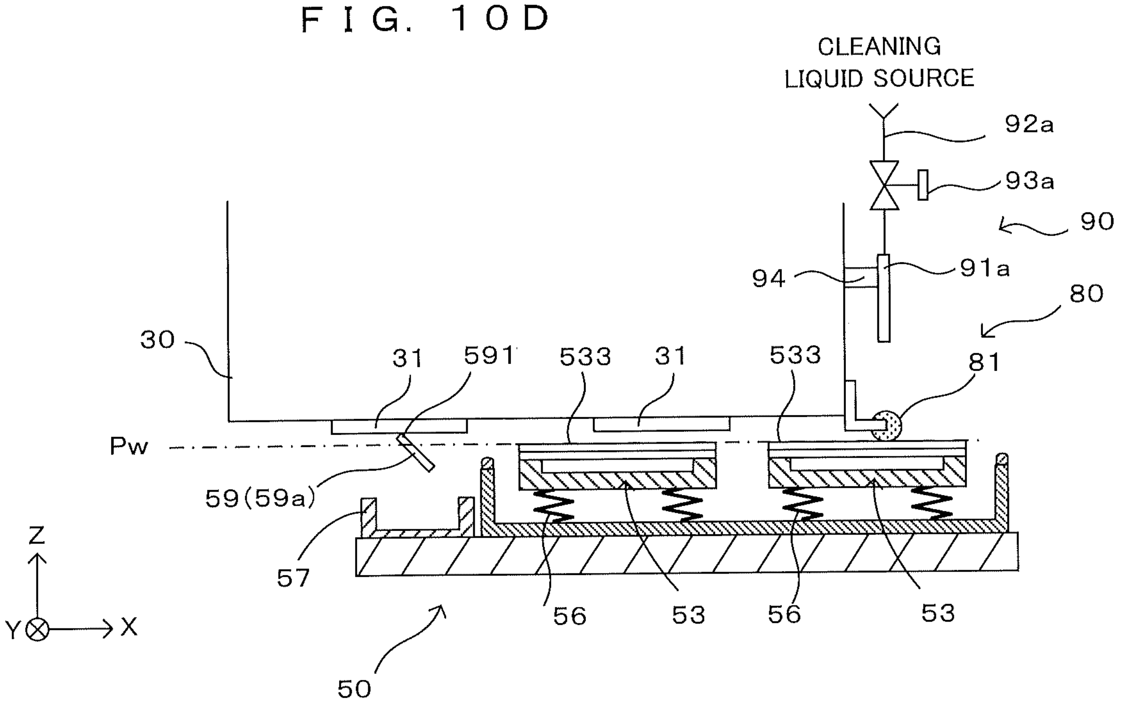
FIG. 10D schematically shows a positional relationship between the printing head, the maintenance part, the cleaning roller, and the tube during the wiping and the cap clearing process.

Subsequent to completion of this preparation, the controller 10 moves the maintenance part 50 in the (+X) direction. As shown in FIG. 10D, along with this movement, the top 591 of the wiper blade 59 is rubbed against the lower surface of the nozzle block 31 to wipe off the ink adhering around the nozzles N (wiping). In parallel with this process, the cleaning roller 81 retaining the cleaning liquid rotates while contacting the top of the sealing member 533, thereby removing the ink adhering to the cap 53 to clean the cap 53 (cap cleaning process). These wiping and cap cleaning process are performed along with the movement of the maintenance part 50 in the (+X) direction.

Figure 10E:
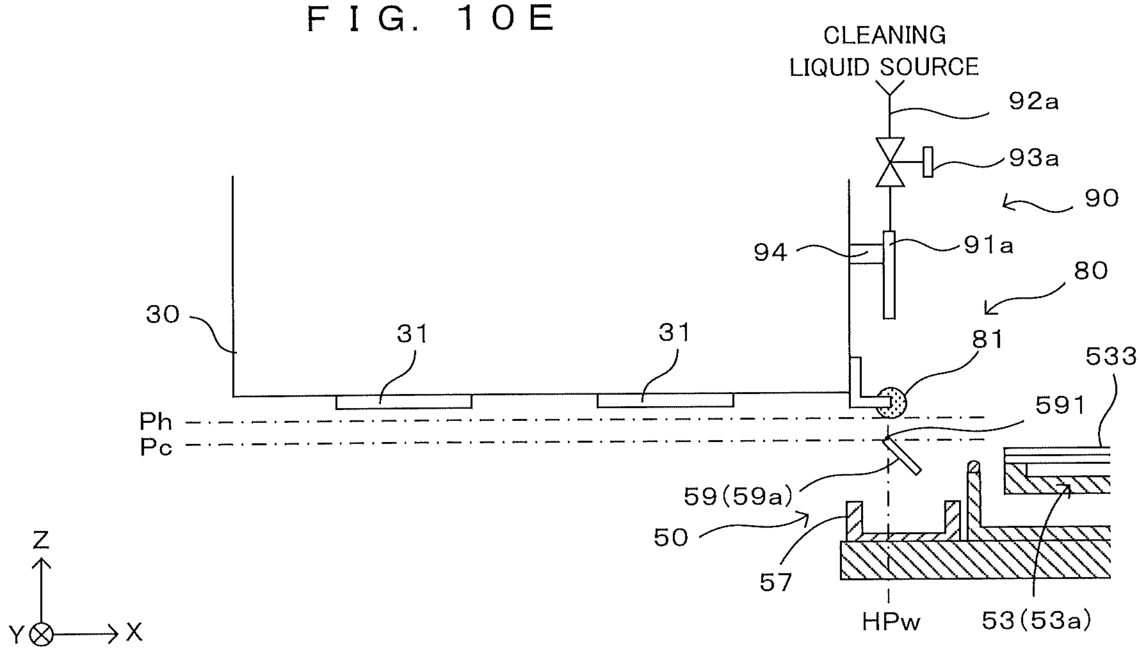
FIG. 10E schematically shows a positional relationship between the printing head, the maintenance part, the cleaning roller, and the tube during the separating process.

After the wiping and the cap cleaning process are completed, the controller 10 controls each part of the apparatus as follows to make preparation for a wipe cleaning process. Specifically, the printing head 30 is lifted from the wiping position Pw to the home position Ph. When the top 591 of the wiper blade 59 thereafter reaches the wipe start position HPw in the X direction as shown in FIG. 10E, the controller 10 stops the movement of the maintenance part 50.

Figure 10F:
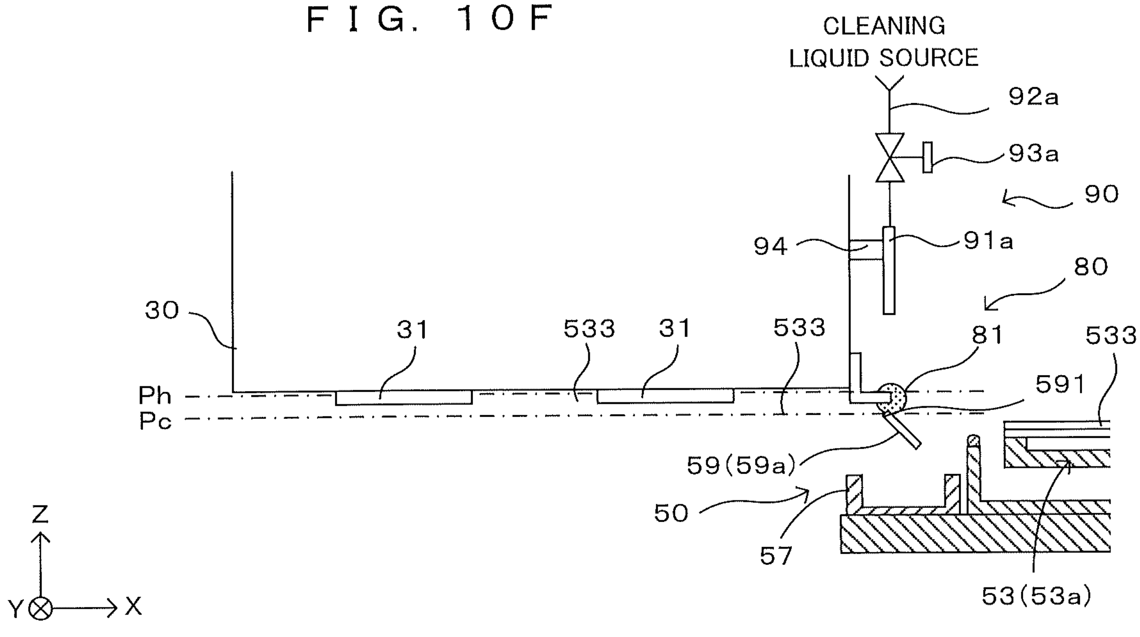
FIG. 10F schematically shows a positional relationship between the printing head, the maintenance part, the cleaning roller, and the tube during the wipe cleaning process.

At the time of completion of preparation for the wipe cleaning process, the maintenance part 50 is positioned in such a manner that the cleaning roller 81 faces the top 591 of the wiper blade 59 from above. Then, the controller 10 lowers the printing head 30 from the home position Ph to the capping position Pc. By doing so, as shown in FIG. 10F, the surface layer 811 of the cleaning roller 81 retaining the cleaning liquid comes into contact with the top 591 of the wiper blade 59 and cleans the top 591 (wipe cleaning process). The wipe cleaning process may be set to be performed once. In the present embodiment, however, the wipe cleaning process is repeated several times. Specifically, for each implementation of the wipe cleaning process, the controller 10 lifts the cleaning roller 81 together with the printing head 30 from the capping position Pc to the home position Ph. More specifically, the separating process of separating the cleaning roller 81 upward from the wiper blade 59 shown in FIG. 10E and the wipe cleaning process of bringing the cleaning roller 81 into contact with the wiper blade 59 shown in FIG. 10F are repeated. By doing so, it becomes possible to clean the top 591 of the wiper blade 59 more favorably. Furthermore, by moving the maintenance part 50 by a small distance in the X direction for each implementation of the wipe cleaning process, a position of contact between the cleaning roller 81 and the wiper blade 59 may be changed in the X direction during cleaning of the top 591 of the wiper blade 59.

After the wipe cleaning process is completed, the controller 10 lifts the printing head 30 from the capping position Pc to the home position Ph and then moves the maintenance part 50 in the (+X) direction. By doing so, the printing apparatus 1 is brought into the state shown in FIG. 2B.

The description given above is mainly intended for the pressurized purging, the wiping, the cap cleaning process, and the wipe cleaning process corresponding to the nozzle block 31 in the nozzle block row C1. Meanwhile, pressurized purging, wiping, a cap cleaning process, and a wipe cleaning process corresponding to the nozzle block 31 in the nozzle block row C2 are performed in the corresponding ways.

As described above, according to the first embodiment of the invention, the cleaning roller 81 is mounted on the printing head 30 in such a manner as to face the maintenance member including the cap 53 and the wiper blade 59 from above. When cleaning of the cap 53 and the wiper blade 59 is not intended, the cleaning roller 81 is separated upward from the cap 53 and the wiper blade 59. Meanwhile, during the cleaning process, the cleaning roller 81 is moved integrally with the printing head 30 in the vertical direction Z relative to the maintenance member (cap 53, wiper blade 59). By doing so, during implementations of the cap cleaning process and the wipe cleaning process, the cleaning roller 81 comes into contact only with the cleaning target sites such as the sealing member 533 of the cap 53 and the top 591 of the wiper blade 59 to clean the tops of these cleaning target sites. As a result, it is possible to clean the cleaning target site favorably without contaminating an area of the maintenance member other than the cleaning target site.

In the above-described embodiment, as shown in FIG. 10D, the wiping and the cap cleaning process are performed in parallel. This allows maintenance to be performed efficiently on the printing head 30.

In the above-described embodiment, as the cleaning roller 81 contacts the cleaning target site such as the sealing member 533 of the cap 53 or the top 591 of the wiper blade 59 in such a manner as to cover the cleaning target site from above, a relatively high contact area is provided. While the cleaning target site slidably contacts the cleaning roller 81 in this way, the cleaning target site passes immediately below the cleaning roller 81 to be cleaned. This allows the cleaning target site to be cleaned favorably.

The foregoing function and effect can also be fulfilled in a configuration using a dedicated elevating mechanism for moving the cleaning roller 81 up and down. However, moving the cleaning roller 81 up and down integrally with the printing head 30 is more preferable as it achieves reduction in size and cost of the printing apparatus 1.

In the first embodiment, the cleaning roller 81 having a circular section is used as a "cleaning execution unit" of the invention. Meanwhile, a cleaner member having a rectangular section or an inverted trapezoidal section may be used. Furthermore, a cleaner member such as a brush or a whisk may be used instead of the cleaning roller 81. Alternatively, a web-like cleaner sheet may be used as the cleaner member. In another case, a bubble cleaning member may be used as the "cleaning execution unit" of the invention that generates bubbles of the cleaning liquid at its lower end and cleans the cleaning target site with the bubbles.

As described above, in the above-described first embodiment, the Z direction, the X direction, and the Y direction correspond to examples of a "vertical direction," a "first direction," and a "second direction" of the invention respectively. The nozzle block rows C1 and C2 correspond to examples of a "first nozzle block row" and a "second nozzle block row" of the invention respectively. The cap 53 and the sealing member 533 correspond to a "cap member" and a "cleaning target site of the cap member" of the invention respectively. The caps 53*a* and 53*b* correspond to examples of a "first cap member" and a "second cap member" of the invention respectively. The wiper blade 59 and the top 591 correspond to examples of a "wiper member" and a "cleaning target site of the wiper member" of the invention respectively. The wiper blades 59*a* and 59*b* correspond to examples of a "first wiper member" and a "second wiper member" of the invention respectively. The tubes 91*a* and 91*b* correspond to examples of a "first tube" and a "second tube" of the invention respectively. The height positions Pc, Pw, and Ph correspond to a "first height position," a "second height position," and a "third height position" of the invention respectively. The surface layer 811 on the (−Y) direction side and the surface layer 811 on the (+Y) direction correspond to a "first cleaning region" and a "second cleaning region" of the invention respectively. The on-off valves 93*a* and 93*b* function as a "liquid feed switching mechanism" of the invention.

Figure 11:
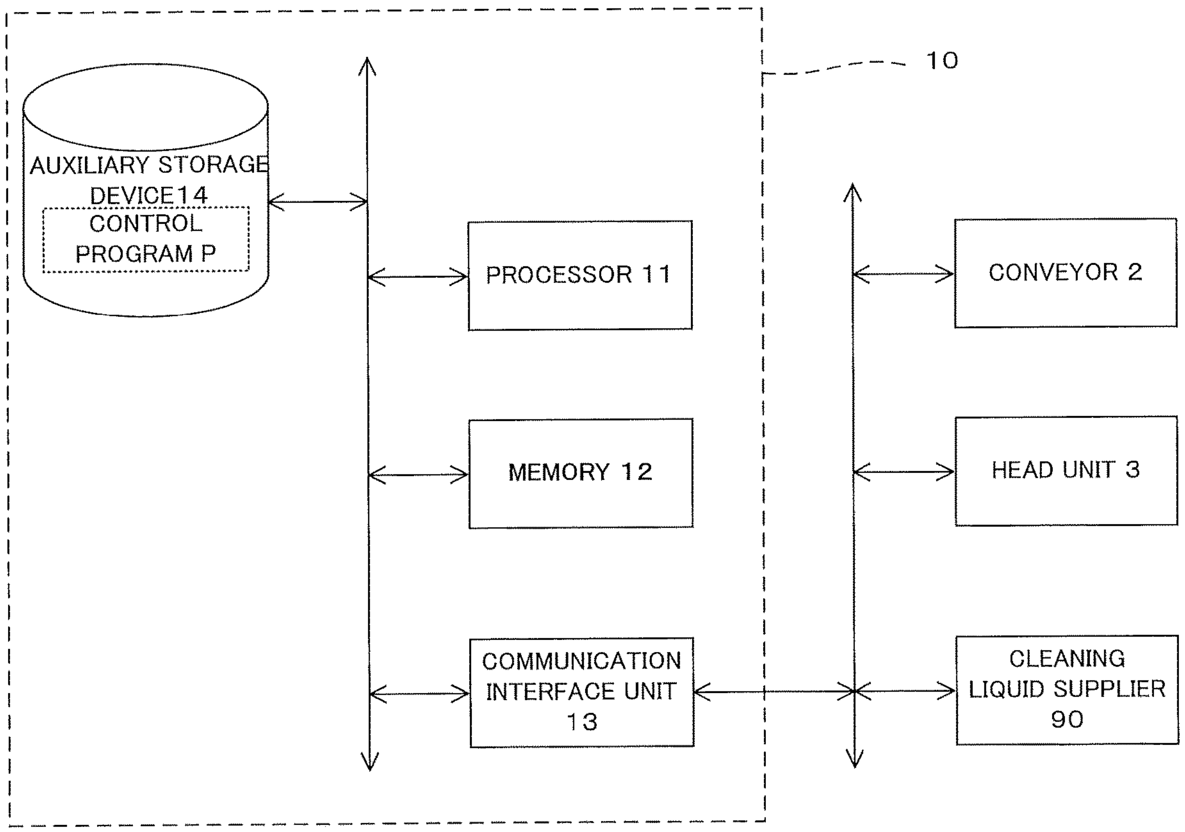
FIG. 11 is a block diagram showing the more detailed hardware configuration of the controller.

A more detailed hardware configuration of the controller 10 will be described by referring to FIG. 11. As shown in FIG. 11, the controller 10 includes a processor 11 such as a CPU, a memory 12 such as a RAM, a communication interface unit 13, and an auxiliary storage device such as a hard disk drive. The processor 11 transmits control signals to the conveyor 2, the head unit 3, the cleaning liquid supplier 90, etc. described above to cause these units to perform the printing process, the maintenance process, and the cleaning process. The memory 12 is used as a region for development of a program P and an operation region for the processor 11. The communication interface unit 13 to make communication transits the control signals generated by the processor 11 to the conveyor 2, the head unit 3 (particularly, elevating mechanism 58, motor 742, motor 753), and the cleaning liquid supplier 90 (particularly, on-off valves 93*a*, 93*b*). The auxiliary storage device 14 stores the control program P necessary for control over the printing process, the maintenance process, and the cleaning process.

Second Embodiment

Figure 12:
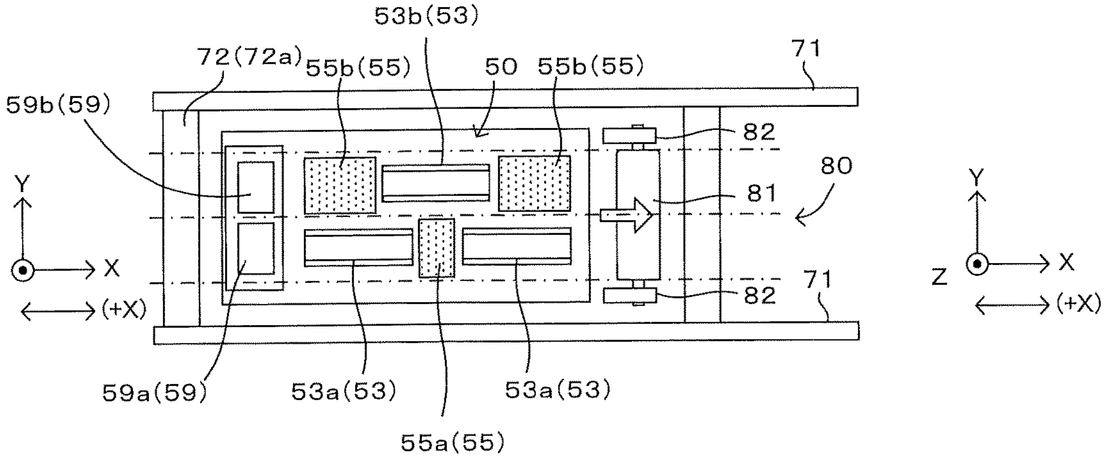
FIG. 12 is a plan view schematically showing a second embodiment of a printing apparatus according to the invention.
Figure 13A:
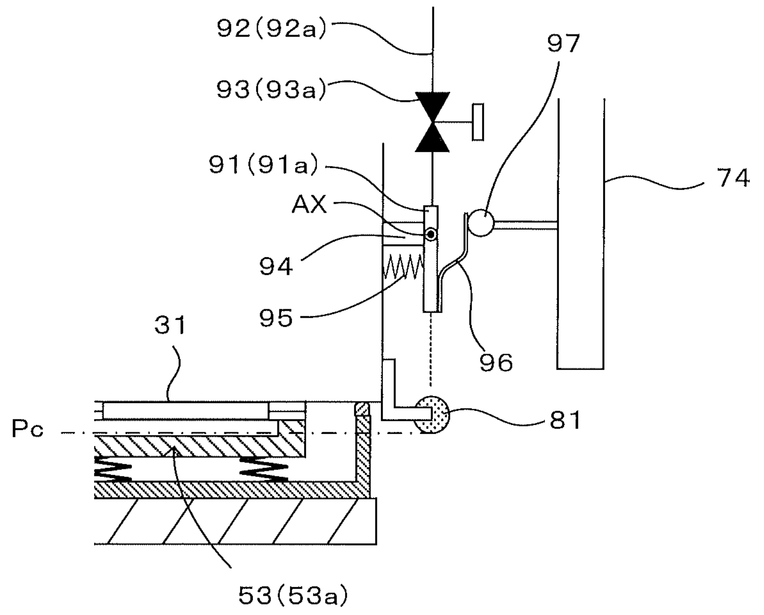
FIGS. 13A and 13B schematically show the configuration and operation of a cleaning liquid supplier provided at the printing apparatus shown in FIG. 12.
Figure 13B:
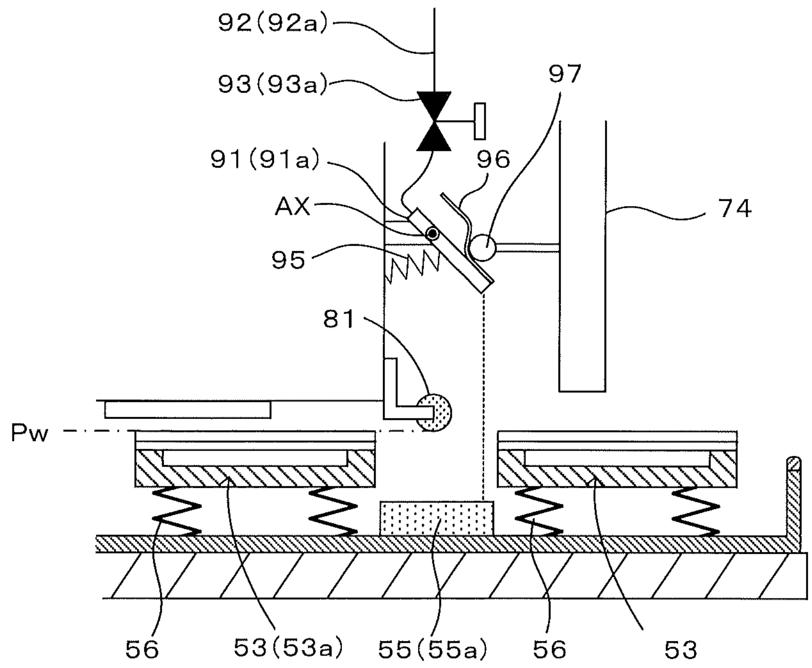

FIG. 12 is a plan view schematically showing a second embodiment of a printing apparatus according to the invention. FIGS. 13A and 13B schematically show the configuration and operation of a cleaning liquid supplier provided at the printing apparatus shown in FIG. 12. The second embodiment largely differs from the first embodiment in that the second embodiment additionally includes a humidifying member 55*a* and a humidifying member 55*b* each made of a porous member and provided at a maintenance part 50, and has a configuration where a destination of supply of a cleaning liquid from a tube 91 is switchable. The configuration is otherwise the same as that of the first embodiment. Thus, in the following description, the differences will be discussed mainly and a structure same as that of the first embodiment will be given the same sign and will not be discussed.

As shown in FIG. 12, at the maintenance part 50, the first humidifying member 55*a* is provided adjacent to the cap 53*a* and the second humidifying member 55*b* is provided adjacent to the cap 53*b* in the X direction. The humidifying members 55*a* and 55*b* are each made of a porous member such as a sponge, and have the function of retaining the supplied cleaning liquid and humidifying the interior of the maintenance part 50 as described next. Instead of the porous member, dishes as reservoirs for the cleaning liquid may be used as the humidifying members 55*a* and 55*b*, for example.

As shown in FIGS. 13A and 13B, for supplying the cleaning liquid to the humidifying member 55*a*, 55*b* in the second embodiment, the tube 91*a*, 91*b* is mounted in a manner allowing an upper end portion thereof to rotate about a rotary shaft AX relative to a side surface of the printing head 30 on the (+X) direction side. A (+X) end portion of a biasing spring 95 is mounted on an intermediary portion of the tube 91*a*, 91*b* on the (−X) direction side below the rotary shaft AX. A (−X) end portion of the biasing spring 95 is fixed to the printing head 30. By doing so, the tube 91*a*, 91*b* is biased anticlockwise in the planes of paper of FIGS. 13A and 13B. Meanwhile, a lower end portion of a cam member 96 is mounted on an intermediary portion of the tube 91*a*, 91*b* on the (+X) direction side. An upper end portion of the cam member 96 slidably contacts a projection 97 projecting in the (−X) direction from the elevating mechanism 74. Thus, when the printing head 30 is moved up and down by the elevating mechanism 74, the tube 91*a*, 91*b*, the biasing spring 95, and the cam member 96 move up and down integrally with the printing head 30 and the cleaning roller 81. As a result, the tube 91*a*, 91*b* is caused to rotate about the rotary shaft AX in response to a height position of the cam member 96.

More specifically, as shown in FIG. 13A, when the printing head 30 is located at the capping position Pc, the tube 91*a*, 91*b* rotates clockwise in the plane of paper of FIG. 13A against the biasing force of the biasing spring 95 to be located in a first tube posture where a lower end portion thereof is pointed toward the cleaning roller 81. The cleaning liquid is dripped from the tube 91*a*, 91*b* in the first tube posture onto the cleaning roller 81 through opening of the on-off valve 93*a*, 93*b* by the controller 10. In this way, the cleaning liquid is supplied to the cleaning roller 81 to wet the surface layer 811 of the cleaning roller 81.

Conversely, as shown in FIG. 13B, for example, when the printing head 30 is moved up from the capping position Pc, the tube 91*a*, 91*b* is rotated anticlockwise in the plane of paper of FIG. 13B by the biasing force of the biasing spring 95 while a position of sliding contact of the cam member 96 with the projection 97 changes from the upper end portion toward the lower end portion of the cam member 96. By doing so, the tube 91*a*, 91*b* is located in a second tube posture where the lower end portion thereof is pointed toward space adjacent to the cleaning roller 81 on the (+X) direction side. The cleaning liquid is dripped from the tube 91*a* in the second tube posture onto the first humidifying member 55*a* located immediately below the adjacent space through opening of the on-off valve 93*a* by the controller 10. In this way, the cleaning liquid is supplied to the first humidifying member 55*a* to wet the interior of the maintenance part 50. While not illustrated in the drawings, the second humidifying member 55*b* is located immediately below the adjacent space. The cleaning liquid is dripped from the tube 91*b* in the second tube posture onto the second humidifying member 55*b* through opening of the on-off valve 93*b* by the controller 10. In this way, the cleaning liquid is supplied to the second humidifying member 55*b* to wet the interior of the maintenance part 50. By doing so, drying of the ink around each nozzle N (FIG. 3) is suppressed.

As described above, in the second embodiment, a combination of the biasing spring 95, the cam member 96, and the projection 97 functions a "posture switching mechanism" of the invention to change the posture of each of the first tube and the second tube in conjunction with the upward and downward movements of the printing head 30. This achieves function and effect as follows. The above-described posture switching may be realized by adding a driving source dedicated to posture switching. In this case, however, the size increase and cost increase of the printing apparatus 1 are unavoidable. By contrast, according to the second embodiment, it is possible to obtain the high-functional printing apparatus 1 while avoiding such problems.

Note that the invention is not limited to the above-described embodiments and various changes other than the aforementioned ones can be made without departing from the gist of the invention. For example, in the above-described embodiments, the cleaning liquid supplier 90 includes the two tubes 91*a* functioning as the "first tube" of the invention and the two tubes 91*b* functioning as the "second tube" of the invention. However, the number of the tubes 91*a* and that of the tubes 91*b* are not limited to these.

Furthermore, a tube may be replaced with a nozzle having a discharge port extending in the Y direction.

While the amount of supply of the cleaning liquid to be supplied from the tube 91*a*, 91*b* to the cleaning roller 81 is controlled using a duration of opening and closing the on-off valves 93*a*, 93*b*. Alternatively, the amount of the cleaning liquid to be supplied per unit time from the tube 91*a*, 91*b* may be controlled in response to the number of the caps 53 forming the nozzle block row C1, C2.

In the above-described second embodiment, the second tube posture is such that the lower end portion of the tube 91*a*, 91*b* is pointed toward the space adjacent to the cleaning roller 81 on the (+X) direction side. Meanwhile, a posture may be controlled in such a manner that the lower end portion is pointed toward space adjacent to the cleaning roller 81 on the (−X) direction side.

A particular configuration for moving the maintenance part 50 in the X direction relative to the cleaning roller 81 is not limited to the exemplary configuration described above. Specifically, instead of driving the maintenance part 50 in the X direction, the printing head 30 and the cleaning roller 81 may be driven in the X direction. In short, the printing head 30 equipped with the cleaning roller 81 and the maintenance part 50 can be moved relative to each other by driving at least one of the printing head 30 and the maintenance part 50.

A particular configuration for moving the printing head 30 and the cleaning roller 81 integrally in the vertical direction Z relative to the maintenance part 50 is not limited to the exemplary configuration described above. Specifically, instead of moving the printing head 30 and the cleaning roller 81 up and down, the maintenance part 50 may be moved up and down in the vertical direction Z. In short, the printing head 30 equipped with cleaning roller 81 and the maintenance part 50 can be moved up and down relative to each other by moving at least one of the printing head 30 and the maintenance part 50 up and down.

In the above-described embodiments, the invention is applied to the printing apparatus 1 including the three nozzle blocks 31. Meanwhile, the number of the nozzle blocks 31 or the layout thereof can be determined freely. For example, the invention is further applicable to a printing apparatus including the nozzle blocks 31 allocated in three or more rows.

Although the invention has been described by way of the specific embodiments above, this description is not intended to be interpreted in a limited sense. By referring to the description of the invention, various modifications of the disclosed embodiments will become apparent to a person skilled in this art similarly to other embodiments of the invention. Hence, appended claims are thought to include these modifications and embodiments without departing from the true scope of the invention.

The invention is applicable to techniques in general for cleaning a maintenance member for maintenance on a nozzle opening plane from which ink is discharged for printing.

What is claimed is:

1. A printing apparatus comprising:

a printing head including at least one or more nozzle blocks each having a nozzle opening plane configured to discharge ink downward;

a maintenance part including a maintenance member configured to maintenance on the nozzle opening plane from below the printing head;

a cleaner part including a cleaning execution unit configured to clean a cleaning target site that is located at a top of the maintenance member and mounted on the printing head in such a manner as to face the maintenance member from above;

an elevating mechanism configured to move the printing head and the cleaner part integrally in a vertical direction relative to the maintenance member; and a controller configured to control the elevating mechanism in such a manner as to bring the cleaning execution unit into contact with a top of the cleaning target site during a cleaning process of cleaning the cleaning target site using the cleaning execution unit.

2. The printing apparatus according to claim 1, further comprising:

a moving mechanism configured to move the maintenance unit relative to the printing head and the cleaner part in a first direction orthogonal to the vertical direction, wherein the cleaning execution unit extends in such a manner as to overlap the cleaning target site in a second direction orthogonal to both the vertical direction and the first direction in a plan view from above during the cleaning process, and the controller is configured to control the moving mechanism in such a manner as to pass the cleaning target site immediately below the cleaning execution unit while sliding the cleaning target site into contact with the cleaning execution unit.

3. The printing apparatus according to claim 2, wherein the maintenance member of the maintenance part includes a cap member configured to cap the nozzle opening plane and a wiper member configured to wipe the nozzle opening plane, the cap member and the wiper member being separated from each other in the first direction, and the controller is configured to control the elevating mechanism in such a manner that the cleaning execution unit is located at a first height position to bring the cleaning execution unit into contact with the cleaning target site of the cap member while the cleaning target site of the cap member is located immediately below the cleaning execution unit, and that the cleaning execution unit is located at a second height position differing from the first height position to bring the cleaning execution unit into contact with the cleaning target site of the wiper member while the cleaning target site of the wiper member is located immediately below the cleaning execution unit.

4. The printing apparatus according to claim 3, wherein a top of the wiper member is configured to contact the nozzle opening plane while the printing head and the cleaning execution unit are located at the first height position, and the controller is configured to control in such a manner as to move the maintenance part in the first direction relative to the printing head and the cleaning execution unit located at the first height position, thereby performing a wiping process and a cap cleaning process in parallel with each other, the wiping process being to wipe the nozzle opening plane using the top of the wiper member, the cap cleaning process being to clean the cleaning target site of the cap member using the cleaning execution unit.

5. The printing apparatus according to claim 3, wherein the controller is configured to control the elevating mechanism in such a manner as to perform a wipe cleaning process and a separating process repeatedly while the cleaning target site of the wiper member is located immediately below the cleaning execution unit, the wipe cleaning process being to locate the cleaning execution unit at the second height position so as to bring the cleaning execution unit into contact with the cleaning target site of the wiper member, the separating process being to lift the cleaning execution unit to a third height position higher than the second height position so as to separate the cleaning execution unit from the cleaning target site of the wiper member.

6. The printing apparatus according to claim 3, further comprising:

a cleaning liquid supplier configured to supply a cleaning liquid for cleaning the cleaning target site to the cleaning execution unit, wherein the printing head includes a plurality of nozzle blocks allocated in a first nozzle block row and a second nozzle block row arranged in the second direction, the maintenance part includes a first cap member and a first wiper member provided correspondingly to the first nozzle block row, and a second cap member and a second wiper member provided correspondingly to the second nozzle block row, the cleaning liquid supplier includes a first tube provided correspondingly to the first nozzle block row, a second tube provided correspondingly to the second nozzle block row, and a liquid feed switching mechanism configured to make a switch between liquid feed of the cleaning liquid to each of the first tube and the second tube and stop of the liquid feed, the first tube, the second tube, and the liquid feed switching mechanism being provided above the cleaning execution unit, and the controller is configured to control the liquid feed switching mechanism, thereby individually adjusting a first supply and a second supply in the cleaning execution unit, the first supply being to supply the cleaning liquid from the first tube to a first cleaning region of the cleaning execution unit to contact the first cap member and the first wiper member, the second supply being to supply the cleaning liquid from the second tube to a second cleaning region of the cleaning execution unit to contact the second cap member and the second wiper member.

7. The printing apparatus according to claim 6, wherein the maintenance part includes a first humidifying member provided adjacent to the first cap member in the first direction and a second humidifying member provided adjacent to the second cap member in the first direction, the cleaning liquid supplier includes a posture switching mechanism configured to switch the posture of each of the first tube and the second tube between a first tube posture and a second tube posture, the first tube posture being a posture of pointing a lower end portion of each of the first tube and the second tube toward the cleaning execution unit, the second tube posture being a posture of pointing the lower end portion of each of the first tube and the second tube toward adjacent space adjacent to the cleaning execution unit in the first direction, and the controller is configured to control the posture switching mechanism and the liquid feed switching mechanism in such a manner that the first tube is switched to the second tube posture and the cleaning liquid is supplied from the first tube to the first humidifying member while the first humidifying member is located immediately below the adjacent space, and the second tube is switched to the second tube posture and the cleaning liquid is supplied from the second tube to the second humidifying member while the second humidifying member is located immediately below the adjacent space.

8. The printing apparatus according to claim 7, wherein the posture switching mechanism is configured to switch the posture of each of the first tube and the second tube in conjunction with upward and downward movements of the printing head made by the elevating mechanism.

9. The printing apparatus according to claim 7, wherein each of the first humidifying member and the second humidifying member is a dish as a reservoir for the cleaning liquid or a porous member.

10. A cleaning method for a printing apparatus, the printing apparatus including a printing head having a nozzle opening plane from which ink is discharged downward, and a maintenance part including a maintenance member for maintenance on the nozzle opening plane from below the printing head, the method being a method of cleaning the maintenance member and comprising:

(a) mounting a cleaning execution unit for cleaning a cleaning target site located at a top of the maintenance member in such a manner that the cleaning execution unit faces the maintenance member from above; and (b) cleaning the cleaning target site using the cleaning execution unit, wherein the operation (b) includes a step of integrally moving the cleaning execution unit and the printing head up and down in a vertical direction relative to the maintenance member, thereby bringing the cleaning execution unit into contact with a top of the cleaning target site.

11. The cleaning method for the printing apparatus according to claim 10, wherein the operation (b) includes a step of moving the maintenance part relative to the printing head and the cleaning execution unit in a first direction orthogonal to the vertical direction while the cleaning execution unit is kept contacting the top of the cleaning target site.

* * * * *